(12) United States Patent
Hellholm et al.

(10) Patent No.: US 9,616,949 B2
(45) Date of Patent: Apr. 11, 2017

(54) ARTICULATED TRACKED VEHICLE

(71) Applicant: BAE Systems Hägglunds Aktiebolag, Örnsköldsvik (SE)

(72) Inventors: Björn Hellholm, Arnäsvall (SE); Björn Nordberg, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 14/787,190

(22) PCT Filed: Apr. 28, 2014

(86) PCT No.: PCT/SE2014/050515
§ 371 (c)(1),
(2) Date: Oct. 26, 2015

(87) PCT Pub. No.: WO2014/182219
PCT Pub. Date: Nov. 13, 2014

(65) Prior Publication Data
US 2016/0107709 A1    Apr. 21, 2016

(30) Foreign Application Priority Data

May 8, 2013    (SE) .................................. 1350564-9

(51) Int. Cl.
*B62D 55/065*   (2006.01)
*B62D 11/20*    (2006.01)
(Continued)

(52) U.S. Cl.
CPC ....... *B62D 55/0655* (2013.01); *A01G 23/003* (2013.01); *B60D 5/00* (2013.01);
(Continued)

(58) Field of Classification Search
CPC ............................ B62D 12/02; B62D 55/0655
See application file for complete search history.

(56) References Cited

U.S. PATENT DOCUMENTS 2,906,358 A    9/1959  Tucker, Sr.
3,302,742 A *  2/1967  Sunderlin .............. B62D 12/00
                                                           180/420
(Continued)

FOREIGN PATENT DOCUMENTS

EP    0552026 A1    7/1993
EP    2192029 A1    6/2010
(Continued)

OTHER PUBLICATIONS

International Preliminary Report on Patentability received for PCT Patent Application No. PCT/SE2014/050515, mailed on Nov. 19, 2015, 7 pages.

(Continued)

*Primary Examiner* — Kevin Hurley
(74) *Attorney, Agent, or Firm* — Morrison & Foerster LLP

(57) ABSTRACT

The present invention relates to an articulated tracked vehicle comprising a front and a rear vehicle unit connected by means of a rigid load-carrying frame. The load-carrying frame is pivotally attached to the front vehicle unit about a substantially vertical front steering link and pivotally attached to the rear vehicle unit about a substantially vertical rear steering link. The vehicle further comprises control means arranged to steer the front vehicle unit relative to the load-carrying frame about the front vertical steering link and to steer the rear vehicle unit relative to the load-carrying frame about the rear vertical steering link, wherein the control means is arranged such that the front and rear vehicle units are individually steerable relative to the load-carrying frame about their respective vertical steering links.

20 Claims, 10 Drawing Sheets

(51) Int. Cl.
   *B62D 7/02*   (2006.01)
   *B62D 7/15*   (2006.01)
   *B60D 5/00*   (2006.01)
   *A01G 23/00*  (2006.01)
   *B60K 6/20*   (2007.10)

(52) U.S. Cl.
   CPC ............... B60K 6/20 (2013.01); B62D 7/026 (2013.01); B62D 7/1509 (2013.01); B62D 11/20 (2013.01); B62D 55/065 (2013.01); *Y10S 903/902* (2013.01)

(56) References Cited

U.S. PATENT DOCUMENTS

| | | |
|---|---|---|
| 3,419,097 A | 12/1968 | Nodwell et al. |
| 3,455,405 A | 7/1969 | Parent |
| 4,029,165 A | 6/1977 | Miller et al. |
| 4,223,908 A * | 9/1980 | Poliker .................. B62D 12/02 180/14.1 |
| 5,125,467 A | 6/1992 | Mancheron et al. |
| 5,332,247 A | 7/1994 | Etherington |
| 7,946,372 B2 * | 5/2011 | Shraga .................... B25J 5/005 180/14.1 |
| 7,950,478 B2 * | 5/2011 | Terry .................... B60G 5/005 180/9.46 |
| 2015/0125252 A1 * | 5/2015 | Berzen Ratzel ....... B62D 12/02 414/800 |

FOREIGN PATENT DOCUMENTS

| | | |
|---|---|---|
| SU | 556985 A1 | 5/1977 |
| SU | 981065 A1 | 12/1982 |

OTHER PUBLICATIONS

International Search Report and Written Opinion received for PCT Application No. PCT/SE2014/050515, mailed on Aug. 26, 2014, 10 pages.

Extended European Search Report (includes Supplementary European Search Report and Search Opinion) received for European Patent Application No. 14794971.3, mailed on Dec. 21, 2016, 8 pages.

* cited by examiner

ARTICULATED TRACKED VEHICLE

CROSS REFERENCE TO RELATED APPLICATIONS

This application is a U.S. National Stage patent application of PCT/SE2014/050515, filed on Apr. 28, 2014, which claims priority to Swedish Patent Application No. 1350564-9, filed on May 8, 2013, the entire contents of which are incorporated herein by reference.

FIELD OF THE INVENTION

The present invention relates to an articulated tracked vehicle.

BACKGROUND OF THE INVENTION

Today's track driven/tracked and wheeled articulated vehicles for forestry work typically consist of two vehicle units in form of a rear and a front vehicle unit where the front and the rear vehicle units are connected by means of an articulated link section about which the vehicle is steered. The ability to transport cargo, the loading capability and the maneuverability of such and similar vehicles are limited.

Consequently, there is a need for presenting improvements in the steering of articulated vehicles intended for forestry work.

SUMMARY OF THE INVENTION

One object of the present invention is to provide an articulated tracked vehicle with improved maneuverability.

Another object of the present invention is to provide an articulated tracked vehicle enabling improved load distribution.

Another object of the present invention is to provide an articulated tracked vehicle with improved steering capability.

These and other objects, which will become apparent from the following description, are achieved by means of an articulated tracked vehicle of the type mentioned in the introduction and which further exhibits the features described below. Preferred embodiments of the vehicle are defined below.

According to one aspect of the present disclosure there is provided an articulated tracked vehicle comprising a front and a rear vehicle unit connected by means of a rigid load-carrying frame, wherein said load-carrying frame is pivotally attached to the front vehicle unit about a substantially vertical front steering link, and pivotally attached to the rear vehicle unit about a substantially vertical rear steering link. Furthermore, the vehicle comprises control means arranged to steer the front vehicle unit relative to the load-carrying frame about the front vertical steering link and to steer the rear vehicle unit relative to the load-carrying frame about the rear vertical steering link. The control means is arranged such that the front and rear vehicle units are individually steerable in relation to the load-carrying frame, about their respective vertical axes.

This implies that the front and rear vehicle units are separately and independently steerable in relation to each other about their respective vertical steering links. This does not mean that the front and rear vehicle units necessarily have to be controlled independently of each other. Quite contrary, the vehicle typically comprises a control unit configured to steer the front vehicle unit about the front vertical steering link and to steer the rear vehicle unit about the rear vertical steering link in a coordinated manner so as to obtain the desired result as to steering of the vehicle in its entirety.

The proposed individual steering of the front and rear vehicle units about a respective vertical steering link improves the maneuverability of the vehicle. That steering of the front vehicle unit does not affect steering of the rear vehicle unit, and vice versa, provides flexibility in the maneuvering of the vehicle.

According to one embodiment, the control means comprises a front steering device arranged to steer the front vehicle unit in relation to the load-carrying frame about the front vertical steering link, and a rear steering device arranged to steer the rear vehicle unit in relation to the load-carrying frame about the rear vertical steering link. To achieve independent steerability of the two vehicle units, the front and rear steering devices are individually controllable independent of each other, by means of said control unit.

In one embodiment, the front steering device and the rear steering device comprise steering elements comprising steering cylinders.

According to another aspect of the present disclosure, there is provided an articulated tracked vehicle comprising a front and a rear vehicle unit, which vehicle comprises a substantially vertical steering link about whose axis said front and rear vehicle units are pivotable, and control means arranged to steer the front and rear vehicle units relative to each other about the vertical steering link, wherein the vertical steering link is arranged substantially centrally of the front vehicle unit, constituting a front vertical steering link configured for pivotal attachment to a rigid load-carrying frame connecting said front and rear vehicle units such that said control means enables steering of the front and rear vehicle units relative to each other by steering the front vehicle unit relative to the load-carrying frame about the axis of said vertical steering link. This will facilitate steering of said front vehicle unit relative to the load-carrying frame, wherein the maneuverability of the vehicle is further improved. Furthermore, the force generated by the load will act centrally on the front vehicle unit, whereby the pressure from the track assemblies of the front vehicle unit on the ground, i.e. the ground pressure, will be evenly distributed over the contact surface between the ground and the endless tracks of the track assemblies. This creates an even and low ground pressure which is advantageous since damages to the ground are hereby efficiently minimized.

According to one embodiment of the articulated tracked vehicle, said rear vehicle unit comprises a rear vertical steering link arranged substantially centrally of the rear vehicle unit, configured for pivotal attachment to the load-carrying frame such that the rear vehicle unit is allowed to pivot relative to the load-carrying frame about the axis of said vertical rear steering link. This will facilitate the steering of said rear vehicle unit relative to the load-carrying frame, whereby maneuverability of the vehicle is further improved. Furthermore, the force generated by the load will act centrally on the front vehicle unit, whereby the pressure from the track assemblies of the front vehicle unit on the ground, i.e. the ground pressure, will be evenly distributed over the contact surface between the ground and the endless tracks of the track assemblies. This creates an even and low ground pressure which is advantageous since damages to the ground are hereby efficiently minimized.

According to one embodiment of the articulated tracked vehicle, said control means is arranged to steer said front and rear vehicle units relative to each other about said rear vertical steering link by steering the rear vehicle unit relative to the load-carrying frame about the axis of said rear vertical steering link. This improves the maneuverability of the vehicle.

According to one embodiment of the articulated tracked vehicle, said front vehicle unit comprises a rolling link extending in the longitudinal direction of load-carrying frame, wherein the load-carrying frame is configured for pivotal attachment to said rolling link such that said front vehicle unit is allowed to rotate relative to the load-carrying frame about the axis of said rolling link such that said front and rear vehicle units are allowed to rotate relative to each other about said rolling link. This will facilitate rotation of said vehicle unit relative to the load-carrying frame about a longitudinal axis of the load-carrying frame, whereby the maneuverability of the vehicle and the vehicle's ability to follow the ground is further improved.

In one embodiment, the axis of said rolling link runs through the load-carrying frame, meaning that the rolling link and the load-carrying frame are located in substantially the same horizontal plane. Hereby, torque that otherwise may arise around the load-carrying frame is minimized, whereby the stability of the vehicle is increased. Thereby, the vehicle can be driven in a faster and safer way.

In a preferred embodiment, the load-carrying frame is thus configured for rotatable attachment to a rolling link located in the extension of the load-carrying frame, in the axial main direction of extension thereof. Thereby, the rolling link axis runs through the load-carrying frame and, preferably, it runs substantially through the centre of gravity of the load-carrying frame. Hereby, frame construction stability and vehicle stability is further improved.

Preferably, the rolling link is arranged in the extension of the load-carrying frame such that the axis of the rolling link substantially coincides with a horizontal plane through the load-carrying frame.

According to one embodiment, a front end of the load-carrying frame is configured for rotatable attachment to a rolling bearing configuration comprising said rolling link, so as to effectuate rotation of the load-carrying frame relative to the front vehicle unit, about the rolling link axis.

According to one embodiment of the articulated tracked vehicle, said control means is arranged to steer the front and rear vehicle units relative to each other by steering the front vehicle unit relative to the load-carrying frame about the axis of said rolling link. Hereby the maneuverability of the vehicle is improved.

According to one embodiment of the articulated tracked vehicle, the front vehicle unit comprises a front track assembly pair, wherein the front vertical steering link is arranged between the respective track assemblies of the front track assembly pair and substantially centrally arranged relative to the longitudinal extension of the front track assembly pair such that the weight of the load carried by the load-carrying frame is distributed to be carried centrally over said track assembly pair of said front vehicle unit, and wherein the rear vehicle unit comprises a rear track assembly pair, wherein the rear vertical steering link is arranged between the respective track assemblies of the rear track assembly pair and substantially centrally arranged relative to the longitudinal extension of the rear track assembly pair such that the weight of the load carried by the load-carrying frame is distributed to be carried centrally over said track assembly pair of said rear vehicle unit. By distributing the load evenly over the vehicle, the track assemblies of the front vehicle unit and the track assemblies of the rear vehicle unit of the tracked vehicle carry the same load, allowing the track assemblies of the front and rear vehicle units to be equally sized. This allows similar track assemblies to be used for the front and the rear vehicle units, and so that similar vehicle units comprising similar centre beams/chassis beams and similar suspension configurations for suspension and resilient suspension of track assemblies, thus reducing the number of vehicle components and so the manufacturing costs, stock of spare parts and maintenance.

According to one embodiment of the articulated tracked vehicle, said control means comprises a first and a second front steering member arranged to pivot said front vehicle unit about said front vertical steering link. Hereby steering of the front vehicle unit relative to the load-carrying frame is facilitated.

According to one embodiment of the articulated tracked vehicle, said control means comprises a first and a second rear steering member arranged to pivot said rear vehicle unit about said rear vertical steering link. Hereby steering of the front vehicle unit relative to the load-carrying frame is facilitated.

According to one embodiment of the articulated tracked vehicle, said control means comprises a first and a second roll steering member arranged to rotate the front vehicle unit relative to the load-carrying frame about the axis of said rolling link such that said front and rear vehicle units are allowed to rotate relative to each other about said rolling link. Hereby, the steering of the front vehicle unit relative to the load-carrying frame about an axis in the main extension direction of the load-carrying frame is facilitated.

According to one embodiment of the articulated tracked vehicle, said first and second steering members and/or said first and second roll steering members are constituted by steering cylinders.

According to one embodiment of the articulated tracked vehicle, said control means further comprises a control unit arranged to individually regulate the control of at least one of said front steering members, said rear steering members and said roll steering members to effectuate pivoting of said front and rear vehicle units relative to each other. This improves the steering of the vehicle which provides for improved maneuverability of the vehicle.

According to one embodiment of the articulated tracked vehicle, said control means further comprises a control unit arranged to individually control the operation of the respective track assembly of said front and rear track assembly pair to effectuate pivoting of said front and rear vehicle units relative to each other. This provides for redundancy in the steering of the vehicle. Furthermore, the maneuverability is improved since a complementing or alternative way of steering by means of steering cylinders is provided. Should, for example, control of the steering cylinders fail due to e.g. malfunction of the hydraulic system, propulsion of the vehicle is still rendered possible by means of said individual control of the track assemblies.

According to one embodiment of the articulated tracked vehicle, said control unit is arranged to individually control the operation of the respective track assembly of said front and rear track assembly pairs based on torque and/or speed control. This provides for effective regulation and hence effective control by means of the individual control of the track assemblies.

According to one embodiment of the articulated tracked vehicle, said control means is arranged to control the pivoting of said front and rear vehicle units about said front and rear vertical steering links to achieve crab steering. By means of such crab steering the impact on the ground is reduced since the endless tracks of the respective front and rear vehicle units are allowed to pass over different areas of the ground. Furthermore, said crab steering serves to improve the lateral stability of the vehicle.

According to one embodiment of the articulated tracked vehicle, the front vertical steering link is pivotally attached to a front centre beam of the front vehicle unit, wherein the centre beam is disposed in between the respective track assemblies of said front track assembly pair and interconnecting said front track assembly pair of said front vehicle unit, and wherein the rear vertical steering link is pivotally attached to a rear centre beam of the rear vehicle unit, wherein the centre beam is disposed in between the respective track assemblies of said rear track assembly pair and interconnecting said rear track assembly pair of said rear vehicle unit. This provides a stable vehicle with good load distribution.

According to one embodiment, said articulated tracked vehicle is a forestry machine.

According to one embodiment, said articulated tracked vehicle is a forwarder.

According to one embodiment, said articulated tracked vehicle is a diesel-electric vehicle.

BRIEF DESCRIPTION OF THE DRAWINGS

The present invention will be better understood by reference to the following detailed description when read in conjunction with the accompanying drawings, wherein like reference numerals refer to like parts throughout the various views, and in which:

FIG. 7b schematically illustrates a top view of the steering device in FIG. 7a;

FIG. 8b schematically illustrates a top view of the steering device in FIG. 8a;

DETAILED DESCRIPTION OF THE INVENTION

Figure 1:
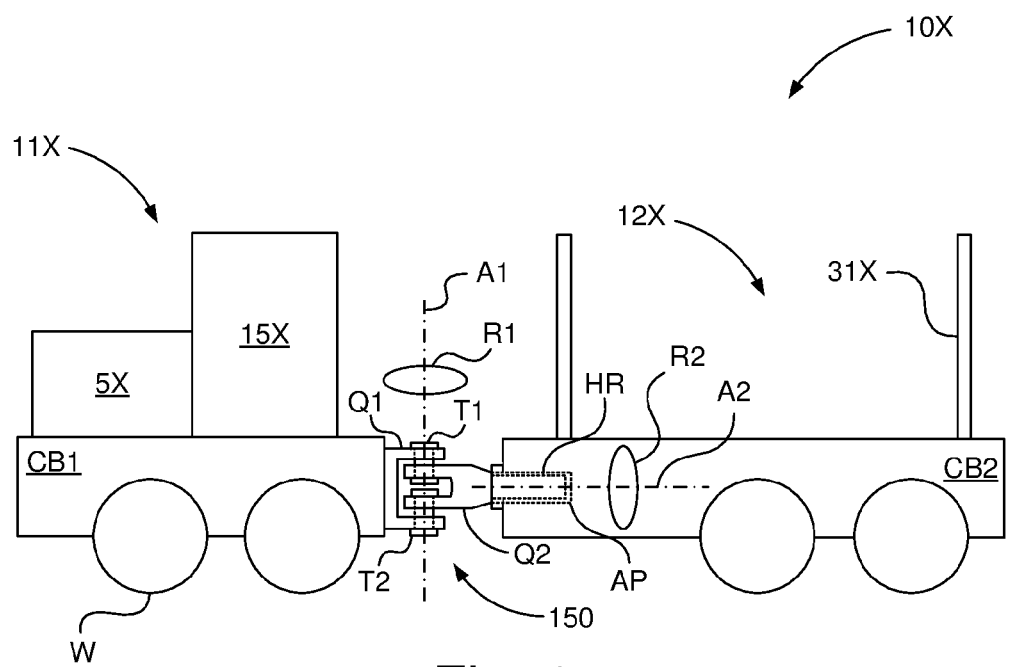
FIG. 1 schematically illustrates a side view of a wheeled articulated forestry vehicle according to prior art.

FIG. 1 shows a configuration of a wheeled forestry vehicle 10X in form of a forwarder with a load-carrying frame according to prior art.

Said vehicle 10X according to prior art is an articulated forestry vehicle, such as a wheeled articulated forwarder arranged to transport cut timber from a harvesting site to a landing site.

Said vehicle 10X comprises a front 11X and a rear vehicle unit 12X connected via an articulated link section.

Said vehicle comprises ground-engaging means in form of a plurality of wheels W. Said front vehicle unit comprises an internal combustion engine 5X for propulsion of said vehicle 10X, and a driver's cabin 15X.

Said rear vehicle unit comprises a load-carrying configuration 31X for carrying load in form of timber. Said front drive vehicle unit comprises a support structure CB1, such as a centre beam for carrying overlying vehicle structure. Said rear vehicle unit comprises a load-carrying structure CB2 for carrying load in form of timber.

Said articulated link section is arranged in between said front and rear vehicle units. In more detail, said articulated link section is disposed in between and connecting said support structure of the front vehicle unit and said load-carrying structure of the rear vehicle unit.

Said articulated link section is constituted by a steering device 150. Said steering device 150 comprises a vertical steering link and a rolling link.

Said vertical steering link is arranged to enable pivoting between the rear and front vehicle units in the direction R1 about an axis A1 of the vertical steering link.

Said rolling link is arranged to enable rotation between the rear and the front vehicle units in the direction R2 about an axis A2 of the rolling link.

Said vertical steering link of said steering device comprises a first articulated link Q1 shaped like two tongues protruding from and fixed to said first vehicle unit, wherein each of said tongues comprises a loop through which said axis A1 runs.

Said first articulated link structure is arranged to be rotatably attached to an intermediate articulated link structure Q2 via a first and a second pin T1, T2 running through said loops to enable rotation between the front and rear vehicle units about said axis A1.

Said second articulated link structure Q2 is provided with a cylinder HR protruding from said second articulated link structure opposite said load-carrying structure CB2 of said rear vehicle unit. Said load-carrying structure is provided with an aperture AP adapted to receive said cylinder of said second articulated link structure.

The second articulated link structure is further arranged to be rotatably attached to said load-carrying structure via said cylinder running in said aperture. In more detail, said second articulated link structure is arranged to be rotatably attached to said load-carrying structure to enable rotation of said front vehicle unit and said rear vehicle unit relative to each other in a direction R2 about an axis A2 running in the longitudinal direction of said vehicle.

This configuration of a vehicle according to prior art is, however, associated with disadvantages in terms of limited load distribution and maneuverability. For example, practically all load in form of timber is carried by the rear vehicle unit. Furthermore, the maximum steering angle that can be achieved between the front and the rear vehicle unit is limited since the articulated link is disposed in between said front and rear vehicle units, i.e. in between said support structure of said front vehicle unit and said load-carrying structure of said rear vehicle unit.

Herein, the term "link" refers to a communication link which may be a physical connection, such as an opto-electronic communication cable, or a non-physical connection, such as a wireless connection, for example a radio or microwave link.

Herein, the term "track support beam" refers to a structural element arranged to support ground-engaging means such as e.g. an endless track as well as drive wheel and support wheels.

Herein, the term "track assembly" refers to a unit of the tracked vehicle comprising track support beam, drive wheel and support wheels as well as a circumferential endless track, which unit is arranged to comprise ground-engaging means and configured to propel the vehicle and thus form at least part of a drive unit of the tracked vehicle.

Herein, the term "track assembly pair" refers to opposite track assemblies of a vehicle unit of the vehicle, one track assembly constituting a right track assembly and the opposite track assembly constituting a left track assembly.

Herein, the term "articulated vehicle" (eng. articulated vehicle) refers to a vehicle with at least a front and a rear vehicle unit which are pivotable relative to each other about at least one joint.

Herein, the term "centrally of the vehicle unit" refers to an area of the vehicle unit which may be located substantially centrally relative to the longitudinal and lateral extensions of the vehicle unit. The term "centrally of the vehicle unit" refers to an area of the tracked vehicle between the track assemblies of the track assembly pair and inside the longitudinal extension of the track assemblies, preferably an area substantially halfway between the front end and the rear end of the track assembly.

Herein, the term "centrally of the track assembly pair" refers to an area of the vehicle unit centrally arranged between the track assemblies of the track assembly pair and centrally in the longitudinal direction of the track assembly pair.

Figure 2:
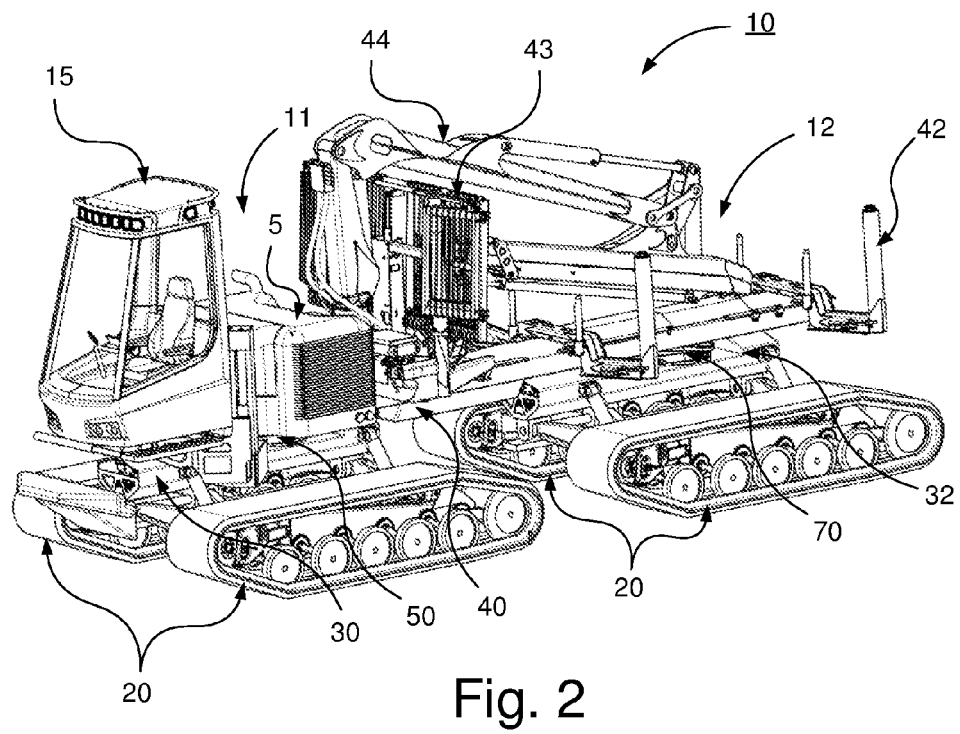
FIG. 2 schematically illustrates a perspective view of an articulated tracked vehicle comprising a load-carrying frame according to an embodiment of the invention.

Referring now to FIG. 2, an articulated tracked vehicle 10 according to the present invention is shown, provided with a front vehicle unit 11 and a rear vehicle unit 12.

Each of the front and rear vehicle units comprises a track assembly pair 20. Said track assembly pair 20 is constituted by or comprised of a drive unit pair. Said track assembly pair 20 comprises two track assemblies 21 arranged on opposite sides of the vehicle. The respective track assembly 21 is constituted by or comprised of a drive unit. Each track assembly 21 is constituted by a driving track assembly and is arranged for propulsion of the vehicle. The respective track assembly pair 20 is connected to an intermediate centre beam 30, 32, such as a chassis beam.

Said centre beam 30, 32 of the respective vehicle unit 11, 12 is arranged for support of vehicle structure, e.g. in form of a vehicle cabin, power supply, load-carrying structure and a crane.

In the vehicle 10 according to this configuration, the centre beam 30 of the front vehicle unit 11 is arranged to carry a vehicle cabin 15 and power supply 5, such as a combustion engine, where the internal combustion engine according to one alternative is constituted by a diesel engine.

In the vehicle 10 according to this configuration, the centre beams 30, 32 of the front and rear vehicle units 11, 12 are further arranged to support a load-carrying structure comprising a load-carrying frame 40, wherein said load-carrying frame 40 according to this alternative is configured to carry a U-beam configuration 42 or a load-carrying configuration 42 for carrying timber and a loading gate 43. The load-carrying frame is, according to this alternative, also arranged to carry a crane 44 for loading/unloading timber. The load-carrying frame 40 is configured to distribute the load substantially centrally over the front and the rear vehicle units 11, 12.

The exemplified vehicle 10 is a tracked forestry vehicle in form of a forwarder intended to transport the timber from a harvesting site to a loading site. The vehicle 10 of the present invention may be constituted by any suitable type of tracked vehicle. The vehicle 10 is, according to one alternative, a harvester intended to harvest the timber.

The exemplified vehicle 10 is a diesel-electric driven vehicle. The vehicle 10 may according to one alternative have any suitable power supply for the propulsion of the vehicle. The vehicle 10 is according to one alternative a hybrid-powered vehicle. The vehicle 10 is according to one alternative electrically driven, where power according to one alternative is supplied by means of an energy storage device such as a battery unit, fuel cell or capacitor unit.

Figure 3:
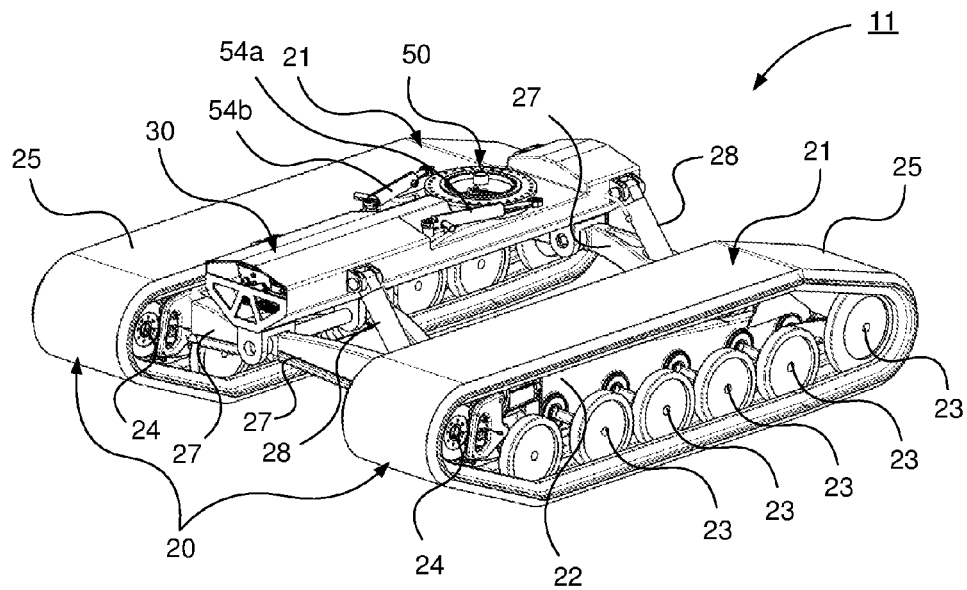
FIG. 3 schematically illustrates a perspective view of a vehicle unit of the vehicle in FIG. 2 according to an embodiment of the present invention.

With reference now made to FIG. 3, there is shown a front vehicle unit 11 comprising a track assembly pair 20 connected to an intermediate centre beam 30.

In more detail, there is shown a front vehicle unit 11 with reference to FIG. 2 with a track assembly pair 20 and with a centre beam connected.

The respective track assembly 21 is arranged to drive the vehicle unit 11. The respective track assembly 21 comprises a track support beam 22, which is here constituted by a skid beam. The respective track assembly further comprises a set of support wheels 23, at least one drive wheel 24, and an endless track 25. Said endless track 25 is arranged to run over the at least one drive wheel 24 and said set of support wheels 23.

Said set of support wheels 23 and the at least one drive wheel 24 are arranged to be rotatably supported by said track support beam 22 in a suitable manner. Said set of support wheels 23 is arranged in a pair configuration, meaning that the respective support wheels 23 of each pair configuration are arranged on opposite sides of said track support beam 22. The support wheel arranged at the very rear of the track support beam 22 also has a track tension wheel function and is constituted by a tension wheel.

Said track assembly 21 further comprises also an electrical drive unit (not shown) operatively coupled to said at least one drive wheel. According to one alternative, the respective track assembly comprises an electrical drive unit. According to one alternative, said electrical drive unit is arranged in said track support beam 22 of said track assembly 21.

In more detail, said centre beam 30 is arranged for connection to and suspension of said two opposite track assemblies 21, i.e. said track assembly pair 20, via a suspension configuration comprising a trailing arm configuration in form of trailing arms 27 articulately attached in one end to the track support beam 22 and in the other end to the centre beam 30, and gas hydraulic cylinders 28 articulately attached in one end to the track support beam 22 and in the other end to the centre beam 30 The two track assemblies 21 of the track assembly pair 20 are arranged on opposite sides of the centre beam 30 so that the centre beam 30 is arranged in between said track assemblies 21 of the track assembly pair 21 and such that the main extension direction of the centre beam 30 is substantially parallel to the main extension direction of the respective track assembly 21 of the track assembly pair 20, as shown in FIG. 3. The same applies to the rear vehicle unit 12 shown in FIG. 2.

The front vehicle unit 11 and the rear vehicle unit 12 are in a basic configuration in which the vehicle unit comprises a track assembly pair 20, a centre bream 30, 32 with a vertical steering link and a suspension configuration for suspension and resilient suspension of track assemblies, designed and sized substantially identical, thereby reducing the number of vehicle components and so reducing costs associated with construction, spare part stock and maintenance.

Figure 9:
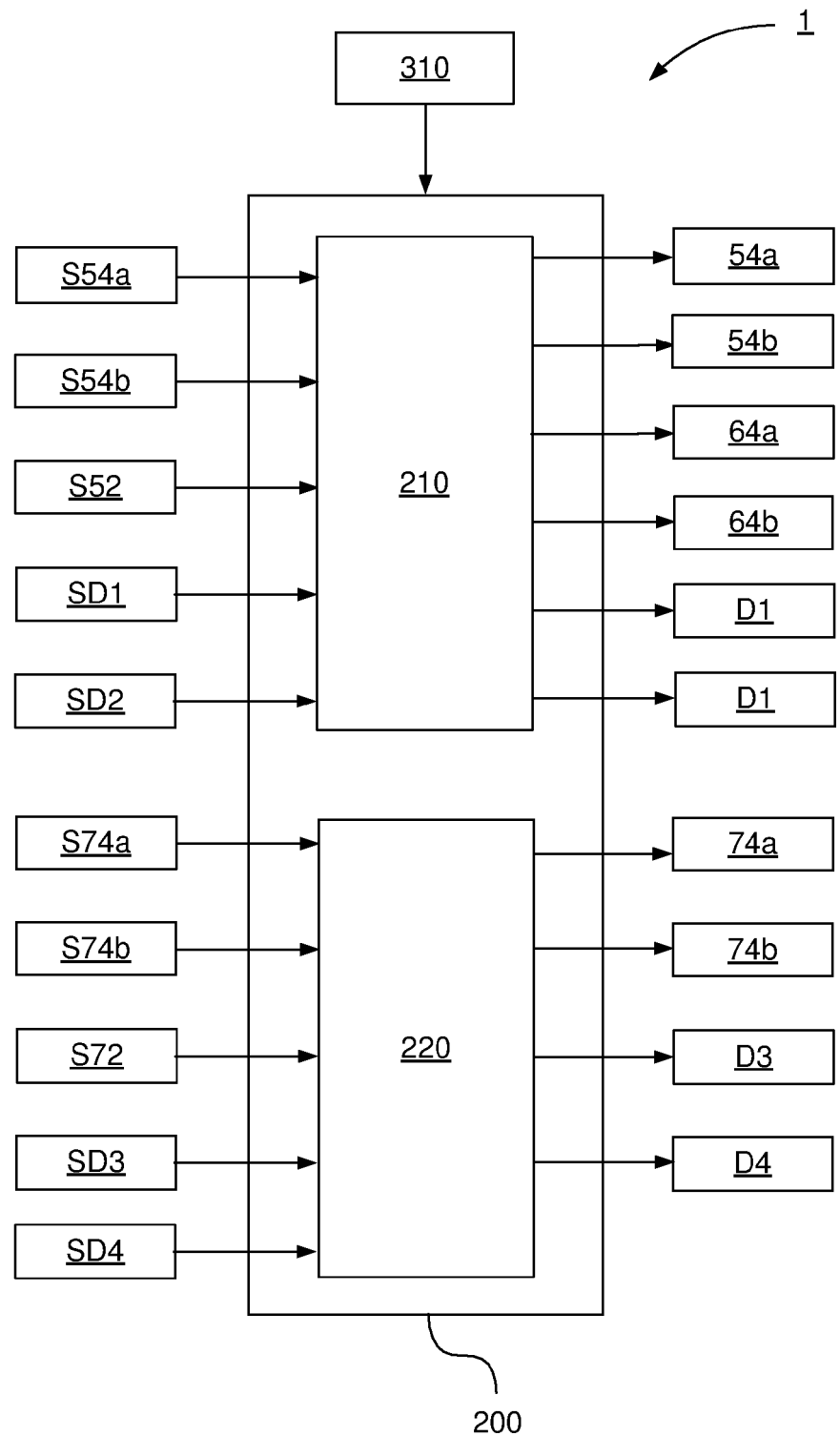
FIG. 9 schematically illustrates a system for steering the articulated vehicle of the present invention.

FIG. 9 shows a perspective view of the front centre beam 30 of the front vehicle unit.

Figure 4A:
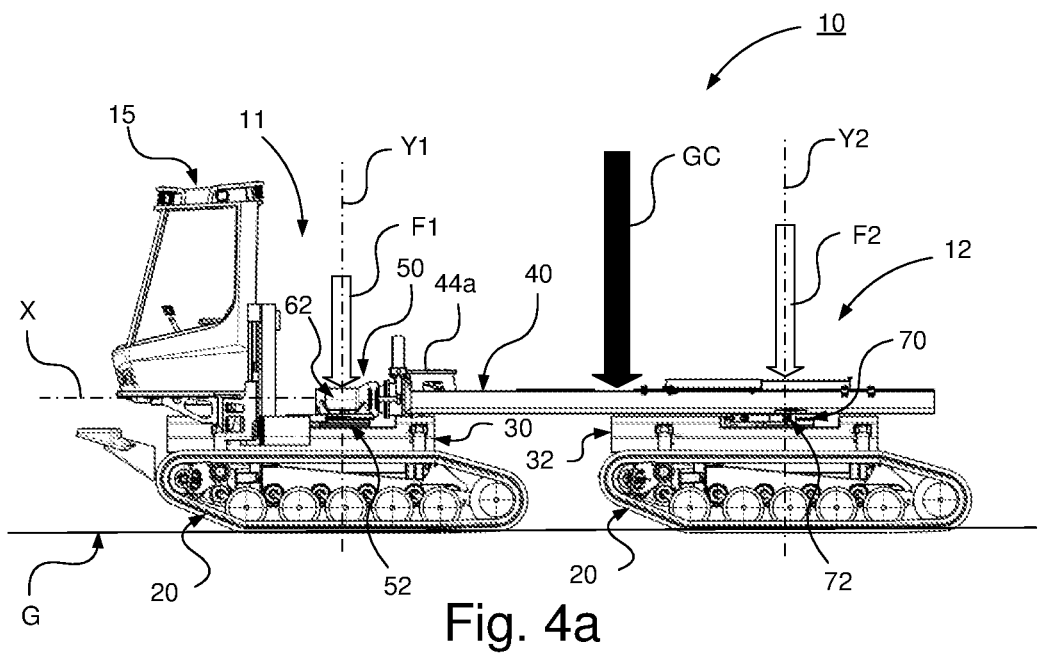
FIG. 4a schematically illustrates a side view of an articulated tracked vehicle comprising a load-carrying frame according to an embodiment of the present invention.
Figure 4B:
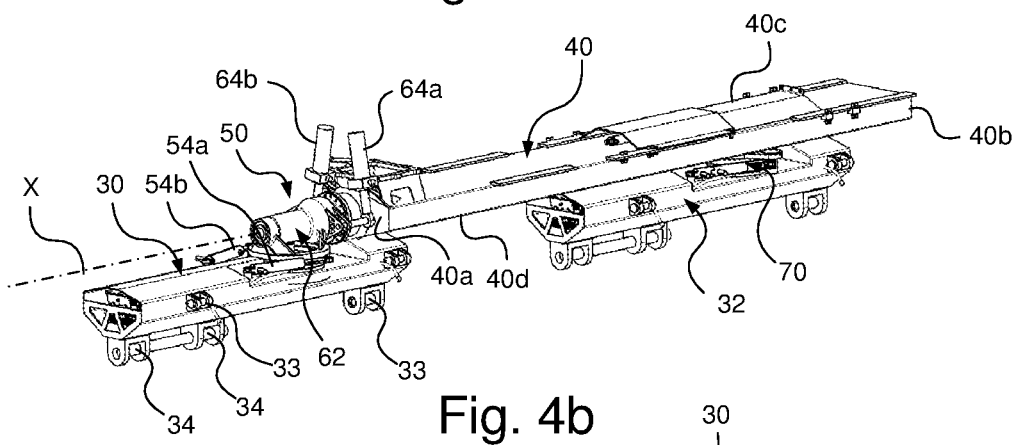
FIG. 4b schematically illustrates a perspective view of the load-carrying frame shown in FIG. 4a connected to underlying centre beams according to an embodiment of the present invention.
Figure 4C:
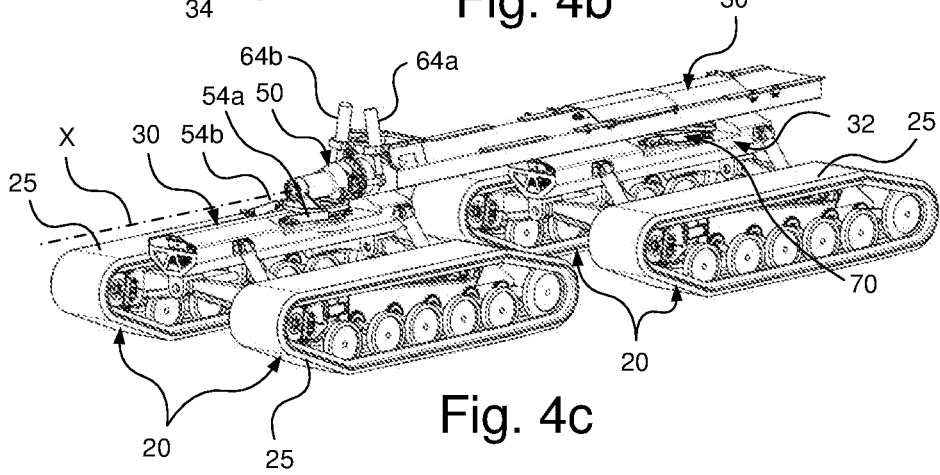
FIG. 4c schematically illustrates a perspective view of an articulated tracked vehicle with a front and a rear vehicle unit connected to the load-carrying frame shown in FIG. 4a according to an embodiment of the present invention.

FIG. 4a shows a side view of an articulated tracked vehicle 10 in form of a tracked forwarder with a rigid load-carrying frame 40 connected to front and the rear vehicle units 11, 12, according to an embodiment of the present invention. FIG. 4b shows a perspective view of the load-carrying frame 40 connected to centre beams 30, 32 of the vehicle 10. FIG. 4c shows a perspective view of the front and rear vehicle units 11, 12 with the load-carrying frame 40 connected to centre beams 30, 32 connected to track assembly pairs 20 of the vehicle 10.

The articulated tracked vehicle 10 comprises a front vertical steering link 52 arranged substantially centrally of the front vehicle unit 11. The front vertical steering link 52 is configured for pivotal attachment to a rigid load-carrying frame 40 connecting said front and rear vehicle units 11, 12. The front and rear vehicle units are pivotable relative to each other about the axis Y1 of the front vertical steering link 52.

The articulated tracked vehicle 10 comprises control means arranged to steer the front and rear vehicle units 11, 12 relative to each other about the front vertical steering link 52. The load-carrying frame 40 is pivotally attached to the front vertical steering link 52 such that said control means enables steering of the front and rear vehicle units relative to each other by steering the front vehicle unit 11 relative to the load-carrying frame 40 about the axis Y1 of said vertical steering link 52.

Said rear vehicle unit 12 comprises a rear vertical steering link 72 arranged substantially centrally of the rear vehicle unit 12 and configured for pivotal attachment to the load-carrying frame 40 such that the rear vehicle unit 12 is allowed to rotate relative to the load-carrying frame 40 about the axis Y2 of said vertical rear steering link 72.

Said control means is arranged to steer said front and rear vehicle units 11, 12 relative to each other about said rear vertical steering link 72 by steering the rear vehicle unit 11 relative to the load-carrying frame about the axis Y2 of said rear vertical steering link 52.

Said front vehicle unit comprises a rolling link 62 extending in the longitudinal direction of load-carrying frame 40, wherein the load-carrying frame 40 is configured for pivotal attachment to said rolling link 62 such that said front vehicle unit 11 is allowed to rotate relative to the load-carrying frame 40 about the axis X of said rolling link 62 such that said front and rear vehicle units 11, 12 are allowed to rotate relative to each other about said rolling link 62.

Said control means is arranged to steer the front and rear vehicle units relative each other by steering the front vehicle unit 11 relative to the load-carrying frame about the axis X of said rolling link 62.

The load-carrying frame 40 is arranged to carry load of the vehicle 10. The vehicle 10 comprises a front and a rear vehicle unit 11, 12. Said vehicle 10 is, according to one alternative, constituted by the vehicle 10 exemplified in FIGS. 1 and 2.

Said load-carrying frame 40 is rigidly configured and comprises/consists of a rigid frame member. Said load-carrying frame 40 is arranged such that the load is distributed over said front and rear vehicle units 11, 12 of the vehicle 10.

Said load-carrying frame 40 has a front side 40a arranged to face forward in the longitudinal extension of the vehicle 10 when the longitudinal extensions of the front and rear vehicle units 11, 12 are substantially aligned. Said load-carrying frame 40 has a rear side 40b arranged to face backward in the longitudinal extension of the vehicle 10 when the longitudinal extensions of the front and rear vehicle units 11, 12 are substantially aligned. Said load-carrying frame 40 further has a top side 40c against which the load is arranged to rest, and an underside 40d intended to be facing and be connected to the centre beam 30, 32 of the respective vehicle unit 11, 12.

Said load-carrying frame 40 is configured for said pivotal attachment to said front and rear vehicle units 11, 12 to enable pivoting of said front and rear vehicle units 11, 12 relative to each other.

The load-carrying frame 40 is configured to enable pivoting about said front vertical steering link 52. In more detail, the load-carrying frame 40 is configured for pivotal attachment about said front vertical steering link 52. Hereby the front vehicle unit 11 and the load-carrying frame 40 are permitted to pivot relative to each other about the axis Y1 of said front vertical steering link 52. The axis Y1 of said front vertical steering link 52 extends substantially perpendicular to the axial main direction of extension of the front vehicle unit 11, and perpendicular to the lateral direction of the front vehicle unit 11.

Said front vertical steering link 52 is arranged substantially centrally relative to the front vehicle unit 11. The axis Y1 of said front vertical steering link 52 is thus arranged to run substantially centrally relative to the front vehicle unit 11. The axis Y1 of said front vertical steering link 52 is arranged to run substantially centrally relative to the longitudinal and lateral directions of the front vehicle unit 11. Said front vertical steering link 52 is arranged substantially centrally between the respective track assemblies 21 of the track assembly pair 20 of the front vehicle unit 11. The axis Y1 of said front vertical steering link 52 is arranged to run substantially centrally between the respective track assemblies 21 of the track assembly pair 20 of the front vehicle unit 11. The axis Y1 of said front vertical steering link 52 is arranged to run substantially centrally relative to the longitudinal extension of the track assembly pair 20 of the front vehicle unit 11.

The load-carrying frame 40 is configured to enable pivoting about said rear vertical steering link 72. In more detail, the load-carrying frame 40 is configured for pivotal attachment about said rear vertical steering link 72. Hereby the rear vehicle unit 12 and the load-carrying frame 40 are permitted to pivot relative to each other about the axis Y2 of said rear vertical steering link 72. The axis Y2 of said rear vertical steering link 72 runs substantially perpendicular to the axial main direction of extension of the rear vehicle unit 12, and perpendicular to the lateral direction of extension of the rear vehicle unit 12.

Said rear vertical steering link 72 is arranged substantially centrally relative to the rear vehicle unit 12. The axis Y2 of said rear vertical steering link 72 is thus arranged to run substantially centrally relative to the rear vehicle unit 12. The axis Y2 of said rear vertical steering link 72 is arranged to run substantially centrally relative to the longitudinal and lateral extensions of the rear vehicle unit 12. Said rear vertical steering link 72 is arranged substantially centrally between the respective track assemblies 21 of the track assembly pair 20 of the rear vehicle unit 12. The axis Y2 of said rear vertical steering link 72 is arranged to run substantially centrally relative to the longitudinal extension of the track assembly pair 20 of the rear vehicle unit 12.

The load-carrying frame 40 is configured to enable pivoting about said rolling link 62. In more detail, the load-carrying frame 40 is configured for pivotal attachment about said rolling link 62. Hereby, said front vehicle unit and said rear vehicle unit are permitted to rotate relative to each other about said rolling link 62. According to this embodiment, the front vehicle unit 11 and the load-carrying frame 40 are permitted to rotate relative to each other about an axis of said rolling link 62. The axis X of said rolling link 62 runs in the axial main direction of extension of the load-carrying frame 40.

The axis X of said rolling link 62 is, in this embodiment, arranged to run such that it intersects the axis Y1 of the front vertical steering link 52. The axis X of said rolling link 62 is arranged to run substantially perpendicular to said front vertical steering link 52.

The fact that the said front and rear vehicle units 11, 12 of the vehicle 10 thus are connected via said load-carrying frame 40 enables pivoting of said front and rear vehicle unit 11, 12 relative to each other about the axis Y1, Y2 of the respective front and rear vertical steering links 52, 72, and also pivoting of said front and rear vehicle units 11, 12 relative to the load-carrying frame 40 about the axis Y1, Y2 of the respective front and rear vertical steering links 52, 72.

The fact that the said front and rear vehicle units 11, 12 of the vehicle thus are connected via said load-carrying frame 40 enables the front and rear vehicle units 11, 12 to roll relative to each other about said axis X of the rolling link 54.

According to this embodiment, the attachment of the load-carrying frame 40 to the rear vehicle unit 12 is configured such that only pivoting of the load-carrying frame 40 relative to the rear vehicle unit 12 about said rear vertical steering link 72 is allowed.

The load-carrying frame 40 is configured for connection to a front steering device 50. Said front steering device 50 is configured for said pivotal attachment of the load-carrying frame 40 to said front vehicle unit 11. Said front steering device 50 comprises said front vertical steering link 52 and said rolling link 62.

Said front steering device 50 is consequently configured to enable rotation of said front vehicle unit and said load-carrying frame 40 relative to each other about said front vertical steering link 52 and said rolling link 62.

The load-carrying frame 40 is configured for connection to a rear steering device 70. Said rear steering device 70 is configured for said pivotal attachment of the load-carrying frame 40 to said rear vehicle unit 12. Said rear steering device 70 comprises said rear vertical steering link 72.

Said rear steering device 70 is consequently configured to enable rotation of said rear vehicle unit 12 and said load-carrying frame 40 relative to each other about said rear vertical steering link 72.

Said front steering device 50 is thus arranged at the front vehicle unit 11 such that said front vertical steering link 52 is arranged substantially centrally of the front vehicle unit 11.

Said rear steering device 70 is thus arranged at the rear vehicle unit 12 such that said rear vertical steering link 72 is arranged substantially centrally of the rear vehicle unit 12.

The load-carrying frame 40 is arranged to rest on a central area of the front and rear vehicle units 11, 12, respectively, such that the weight of the load carried by the load-carrying frame 40 is carried centrally of the respective vehicle units 11, 12. In more detail, the front and rear steering devices 50, 70 connecting said load-carrying frame 40 with said front and rear vehicle units 11, 12 are arranged centrally of the respective vehicle units 11, 12 such that the weight of the load carried by the load-carrying frame 40 is carried centrally of the respective vehicle unit 11, 12.

The load-carrying frame 40 is arranged to rest on a central area between said track assemblies 21 of the track assembly pair 20 of the front and rear vehicle units 11, 12, such that the weight of the load carried by the load-carrying frame 40 is carried centrally of the respective track assembly pair 20 to optimally distribute the ground pressure of the respective track assembly 21, i.e. to make it as low as possible. In more detail, the front and rear steering devices 50, 70 connecting said load-carrying frame 40 with said front and rear vehicle units 11, 12 are arranged centrally between said track assemblies 21 of the track assembly pair 20 of the respective vehicle unit 11, 12 such that the weight of the load carried by the load-carrying frame 40 is carried centrally of the respective track assembly pair 11, 12.

Consequently, the front and rear steering devices 50, 70 are arranged to carry the load-carrying frame 40.

According to this embodiment, the vehicle 10 is, in accordance with the vehicle exemplified with reference to FIGS. 1-2, configured with a front and a rear centre beam 30, 32 connecting the track assemblies 21 of the track assembly pair of the respective vehicle unit 11, 12.

The front steering device 50 is journaled to said front centre beam 30 of the front vehicle unit 11 about said front vertical steering link 52. The front steering device 50 is journaled to said front centre beam 30 of the front vehicle unit 11 such that the weight of the load carried by the load-carrying frame 40 is carried by the front centre beam 30 via the front steering device 50.

The rear steering device 70 is journaled to said rear centre beam 32 of the rear vehicle unit 12 about said rear vertical steering link 72. The rear steering device 70 is journaled to said rear centre beam 32 of the rear vehicle unit 12 such that the weight of the load carried by the load-carrying frame 40 is carried by the rear centre beam 32 via the rear steering device 70.

The front steering device 50 is journaled to said load-carrying frame 40 about said rolling link 62.

With reference now made to FIG. 4a, distribution of load of the vehicle 10 is illustrated. The load is configured to be distributed over substantially the entire longitudinal extension of the load-carrying frame 40. The load consists of e.g. timber. When the load is distributed over substantially the entire longitudinal extension of the load-carrying frame 40, the centre of gravity GC of the load will be located centrally over the load-carrying frame 40, as illustrated by the filled arrow GC. This implies that the forces F1, F2 generated by the load and consequently distributed over the load-carrying frame 40 act on the respective vehicle unit 11, 12 as illustrated by the non-filled arrows F1, F2.

Consequently, the forces F1 and F2, respectively, generated by the load, will act centrally on the respective vehicle unit 11, 12. Thereby, the pressure from the track assemblies 21 on the ground G, i.e. the ground pressure, will be evenly distributed over the contact surface between the ground G and the endless tracks 25 of the track assemblies. This creates a low ground pressure which is advantageous since damages to the ground are hereby efficiently minimized.

The force F1 acting on the front vehicle unit 11 is arranged to act on the front steering device connected to the load-carrying frame 40, substantially in the direction of the axis of the front vertical steering link 52 of the rear steering device 50.

The force acting on the rear vehicle unit 12 is arranged to act on the rear steering device connected to the load-carrying frame 40, substantially in the direction of the axis of the rear vertical steering link 72 of the rear steering device 70.

Said load-carrying frame 40 of the vehicle 10 is arranged for supporting the vehicle structure, according to this alternative in form of beam configuration, loading gate and crane. Said crane is arranged to be attached to a crane attachment 44a of the load-carrying frame 40.

A power supply 5, such as an internal combustion engine illustrated in FIG. 2, is arranged to be supported centrally of the front vehicle unit 11. In more detail, the power supply 5 is arranged to be supported by the front steering device 50 connected to the load-carrying frame 40. This provides for improved weight distribution of the front vehicle unit 11.

By distributing the load evenly over the vehicle 10, the track assemblies 21 of the track assembly pair 20 of the front vehicle unit 11 and the track assemblies 21 of the track assembly pair 20 of the rear vehicle unit 12 of the tracked vehicle 10 carry the same load, allowing the track assemblies 21 of the front vehicle unit and the rear vehicle unit to be equally sized. This allows similar track assemblies to be used for the front and the rear vehicle units 11, 12, and so that similar vehicle units 11, 12 comprising similar centre beams 30, 32 and similar suspension configurations for suspension and resilient suspension of track assemblies, thus reducing the number of vehicle components and so the manufacturing costs, stock of spare parts and maintenance.

Figure 6A:
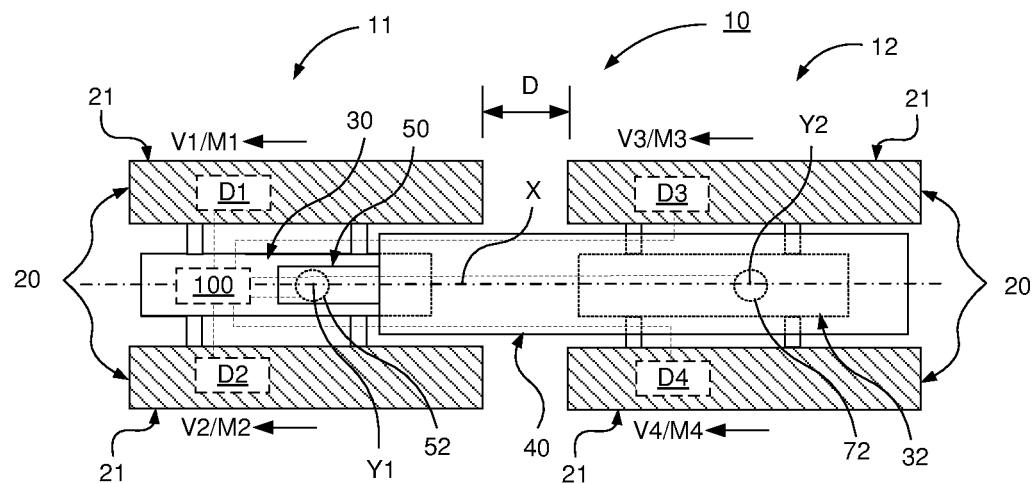
FIG. 6a schematically illustrates a top view of an articulated tracked vehicle with a front and a rear vehicle unit connected to a load-carrying frame of the present invention, where the vehicle is in a basic position in which the longitudinal extensions of the front and rear vehicle units are aligned.

In a basic position, said front and rear vehicle units 11, 12 are arranged relative to each other such that the longitudinal extension of the front vehicle unit 11 is substantially aligned with the longitudinal extension of the rear vehicle unit 12. In said basic position, said front and rear vehicle units 11, 12 are arranged relative to each other such that the track assemblies 21 of the track assembly pair 20 of the front vehicle unit 11 are substantially aligned with the track assemblies 21 of the track assembly pair of the rear vehicle unit 12. In said basic position, said front and rear vehicle units 11, 12 are arranged relative to each other such that the longitudinal extension of the centre beam of the front vehicle unit is substantially aligned with the longitudinal extension of the centre beam of the rear vehicle unit 12. In said basic position, the front and the rear vehicle units 11, 12 are arranged relative to each other such that the longitudinal extension of the load-carrying frame 40 is aligned with the longitudinal extensions of the front and rear vehicle units 11, 12. FIG. 6a illustrates said basic configuration of the vehicle 10.

In said basic position of the front and rear vehicle units 11, 12 of the vehicle 10, the load-carrying frame 40 is arranged to extend over a rear section of the front vehicle unit 11 and extend substantially over the rear vehicle unit 12 such that the weight of load carried by the load-carrying frame 40 is carried centrally of the respective track assembly pair 20.

In said basic position of the front and rear vehicle units 11, 12 of the vehicle 10, the load-carrying frame 40 is arranged to extend over the front vehicle unit 11 such that said front steering device 50 rests on the front centre beam 30.

In said basic position of the front and rear vehicle units 11, 12 of the vehicle 10, the load-carrying frame 40 is configured to extend over the rear centre beam 32 of said rear vehicle unit 12, such that said rear steering device 70 rests on the rear centre beam 32.

Said front steering device 50 comprises front steering members in form of steering cylinders 54a, 54b for steering the front vehicle unit 11 and the load-carrying frame 40 relative to each other. In more detail, the front steering device 50 comprises a first and a second front steering cylinder 54a, 54b arranged to rotate said front vehicle unit 11 and said load-carrying frame 40 relative to each other about said front vertical steering link 52. Said first and second steering cylinders 54a, 54b are arranged on opposite sides of the axis Y1 of said front vertical steering link 52. Said first and second front steering cylinder 54a, 54b is in one of its end pivotally attached to the front centre beam 30 and in its other end pivotally attached to the front vertical steering link 52 of the front steering device 50.

In one embodiment, said control means comprises said first and second front steering cylinders 54a, 54b arranged to rotate said front vehicle unit 11 and said load-carrying frame 40 relative to each other about said front vertical steering link 52.

Said first and second front steering cylinder 54a, 54b comprises a respective cylinder and a piston provided with a piston rod. Said cylinder of the first and second front steering cylinders 54a, 54b is pivotally attached to the front centre beam 30 and said piston rod is pivotally attached to the front vertical steering link 52 of the front steering device 50. Said first and second front steering cylinders 54a, 54b are, according to this alternative, hydraulic steering cylinders.

Said front steering device 50 comprises roll steering elements in form of roll steering cylinders 64a, 64b for steering the front vehicle unit 11 and the load-carrying frame 40 relative to each other. In more detail, the front steering device 50 comprises a first and a second front roll steering cylinder 64a, 64b arranged to rotate said vehicle unit 11 and said load-carrying frame 40 relative to each other about said rolling link 62. Said first and second front roll steering cylinders 64a, 64b are arranged on opposite sides of the axis X of said rolling link 62. Said first and second front roll steering cylinder 64a, 64b is in one end pivotally attached to the load-carrying frame 40 and in its other end pivotally attached to the rolling link 62 of the front steering device 50.

Said roll steering cylinders 64a, 64b are, according to one alternative, provided with functionality for stabilizing the vehicle units 11, 12 relative to each other, and functionality for enhanced comfort. According to one alternative, said roll steering cylinders 64a, 64b are provided with a locking functionality to stabilize the front vehicle unit 11 in relation to the rear vehicle unit 12 and the load-carrying frame 40. According to one alternative, said roll steering cylinders 64a, 64b are provided with damping functionality to enhance vehicle comfort. According to one alternative, said roll steering cylinders 64a, 64b are provided with angle adjustment functionality for adjusting the angle so as to e.g. level the load-carrying frame 40.

Said control means comprises said first and a second roll steering cylinders 64a, 64b arranged to rotate the front vehicle unit 11 relative to the load-carrying frame 40 about the axis X of said rolling link 62 such that said front and rear vehicle unit 11, 12 is allowed to rotate relative to each other around said rolling link 62.

Said first and second roll steering cylinder 64a, 64b comprises a respective cylinder and a piston provided with a piston rod. Said cylinder of the first and second roll steering cylinder is pivotally attached to the load-carrying frame 40 and said piston rod is pivotally attached to the rolling link 62 of the front steering device 50. Said first and second roll steering cylinders 64a, 64b are, according to this alternative, hydraulic steering cylinders.

Said rear steering device 70 comprises rear steering members in form of steering cylinders 54a, 54b for steering the rear vehicle unit 12 and the load-carrying frame 40 relative to each other. In more detail, the rear steering device 70 comprises a first and a second rear steering cylinder 74a, 74b arranged to rotate said rear vehicle unit 12 and said load-carrying frame 40 relative to each other about said rear vertical steering link 72. Said first and second steering cylinders 54a, 54b are arranged on opposite sides of the axis Y2 of said rear vertical steering link 72. Said first and second rear steering cylinder 74a, 74b is in one of its end pivotally attached to the centre beam and in its other end pivotally attached to the rear vertical steering link 72 of the rear steering device 70.

Said control means comprises said first and second rear steering cylinders 74a, 74b arranged to rotate said vehicle unit 12 and said load-carrying frame 40 relative to each other about said rear vertical steering link 72.

Said first and second rear steering cylinder 74a, 74b comprises a respective cylinder and a piston provided with a piston rod. Said cylinder of the first and second rear steering cylinders 74a, 74b is pivotally attached to the centre beam 30 and said piston rod is pivotally attached to the rear vertical steering link 72 of the rear steering device 70. Said first and second rear steering cylinders 74a, 74b are, according to this alternative, hydraulic steering cylinders.

According to the embodiment described above the front steering device 50 comprises first and second steering members in form of first and second steering cylinders 54a, 54b, and first and second roll steering members in form of roll steering cylinders 64a, 64b, and the rear steering device 70 first and second steering members in form of first and second steering cylinders 74a, 74b, wherein the steering cylinders 54a, 54b, 74a, 74b and the roll steering cylinders 64a, 64b are constituted by hydraulic steering cylinders/roll steering cylinders with cylinder and piston rod.

Any suitable steering members/roll steering members could alternatively be used. According to one embodiment, the steering members and/or the roll steering members of said front steering device 50 and/or the steering members of said rear steering device 70 are constituted by steering rack members. According to one embodiment the steering members and/or the roll steering members of said front steering device 50 and/or the steering members of said rear steering device 70 are constituted by a linear motor, which, according to one alternative, is constructed with a ball screw and a ball nut arranged to move along the ball screw, wherein the nut is arranged to be moved by rotating the ball screw by means of an electric motor.

Instead of said front steering members being constituted by a first and a second steering cylinder, said front steering members could, according to one alternative, consist of a single steering cylinder for steering the front vehicle unit relative to the load-carrying frame about the axis of the front vertical steering link.

Instead of said rear steering members being constituted by a first and a second steering cylinder, said rear steering members could, according to one alternative, consist of a single steering cylinder for steering the rear vehicle unit relative to the load-carrying frame about the axis of the rear vertical steering link.

Instead of said roll steering members being constituted by a first and a second roll steering cylinder, said roll steering members could, according to one alternative, consist of a single roll steering cylinder for steering the front vehicle unit relative to the load-carrying frame about the axis of the rolling link.

Furthermore, said control means comprises a control unit arranged to individually regulate the control of at least one of said front steering members 54a, 54b, said rear steering members 74a, 74b and said roll steering members 64a, 64b to achieve rotation of said front and rear vehicle units 11, 12 relative to each other. An embodiment of said control unit will be described below with reference to FIG. 9.

Preferably, the control unit is arranged to control all of the front steering members 54a, 54b, the rear steering members 74a, 74b and the roll steering members 64a, 64b individually. This means that the vehicle is provided with control means through which the front 11 and the rear 12 vehicle units are individually steerable independently of each other relative to the load-carrying frame 40, about the respective vertical axis Y1, Y2.

With reference now made to FIGS. 5a-b and 6a-d, there is shown a top view of the vehicle units of the vehicle 10. FIGS. 5a-b and 6b-d show the vehicle units 11, 12 of the vehicle 10 in different pivoted positions relative to each other. FIG. 6a shows said basic position of the vehicle 10, i.e. that the vehicle units 11, 12 and the load-carrying frame 40 are not pivoted relative to each other.

Figure 5A:
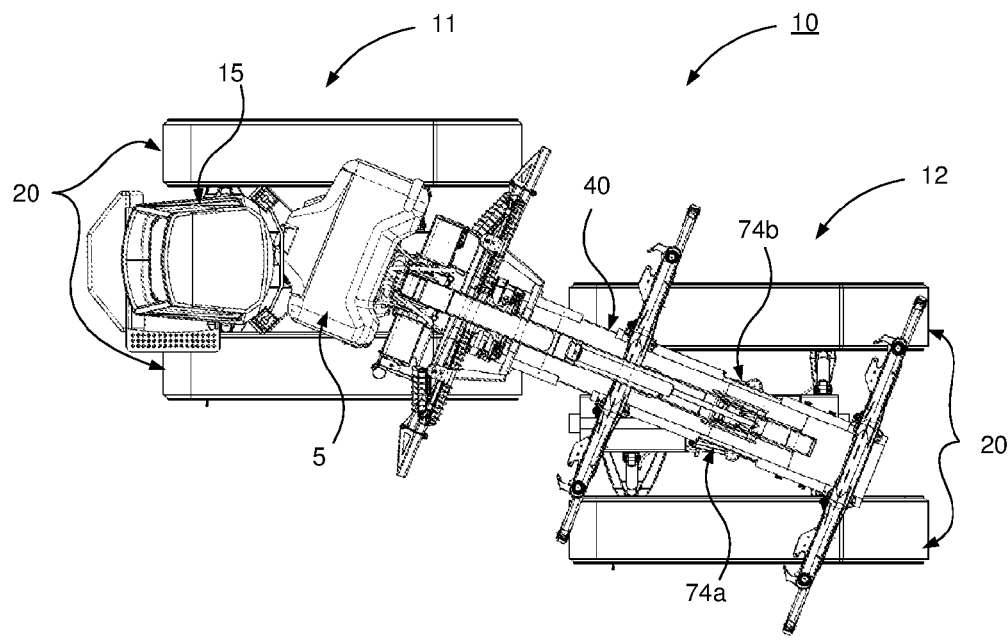
FIG. 5a schematically illustrates a top view of an articulated tracked vehicle with a front and a rear vehicle unit connected to the load-carrying frame shown in FIG. 4a during crab steering according to an embodiment of the present invention.
Figure 6B:
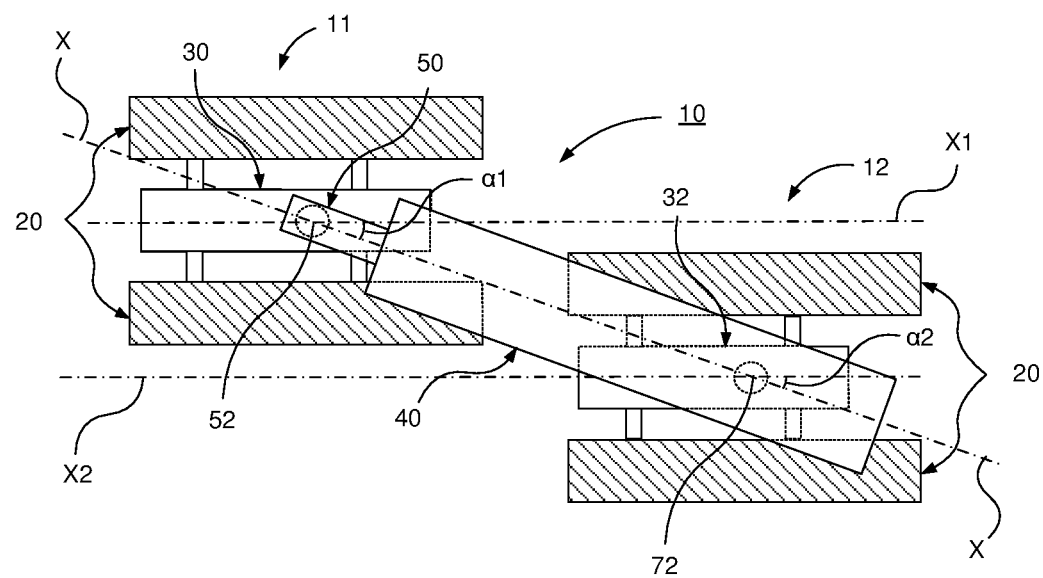
FIG. 6b schematically illustrates a top view of an articulated tracked vehicle with a front and a rear vehicle unit connected with the load-carrying frame shown in FIG. 6a during crab steering according to an embodiment of the present invention.

FIGS. 5a and 6b show the vehicle 10 during so called crab steering, i.e. when the front and rear vehicle units 11, 12 are parallel to each other in their longitudinal extensions and where the load-carrying frame 40 is pivoted relative to said front and rear vehicle units 11, 12 about the respective front and rear vertical steering links 52, 72. This causes the front and rear vehicle units 11, 12 to be displaced in parallel relative to each other such that the load-carrying frame 40 forms a first angle α1 relative to the longitudinal extension of the first vehicle unit 11, and such that the load-carrying frame 40 forms a second angle α2 relative to the longitudinal extension of the second vehicle unit, wherein said first and second angles are substantially equal.

According to one embodiment, said crab steering is achieved by means of said control means by said first and second front steering cylinders 54a, 54b of the front steering device 50 and the first and second rear steering cylinders 74a, 74b of the rear steering device 70 controlling the rotation about the respective axis Y1, Y2 of the respective front and rear vertical steering links 52, 72, such that said first and second angles α1, α2 are formed. According to one embodiment, the steering cylinders 54a, 54b, 74a, 74b are arranged to be locked in this position to maintain the positions of the vehicle units 11, 12 and the load-carrying frame 40 relative to each other during propulsion of the vehicle 10 during said crab steering. Accordingly, said control means is arranged to control the rotation of said front and rear vehicle units 11, 12 about said front and rear vertical steering links 52, 72 to achieve crab steering.

By means of such crab steering the impact on the ground is reduced since the endless tracks 25 of the respective front and rear vehicle units 11, 12 are allowed to pass over different areas of the ground G. Furthermore, said crab steering serves to improve the lateral stability of the vehicle 10.

Figure 5B:
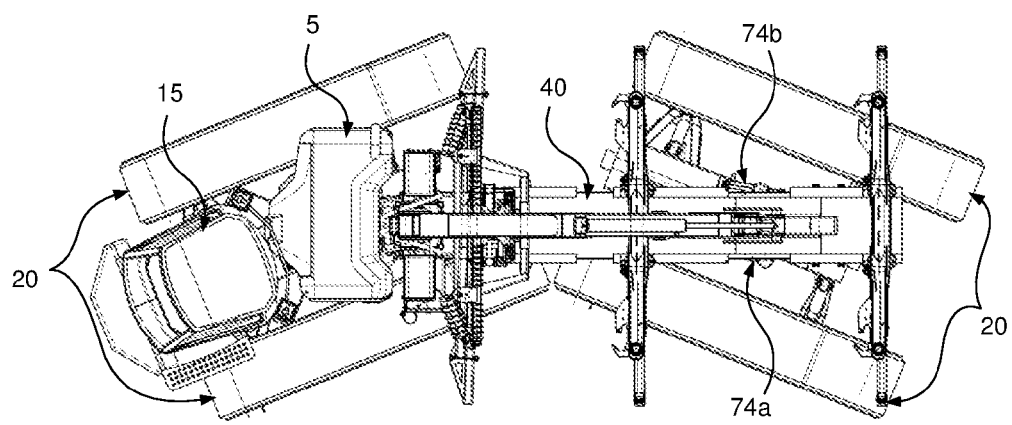
FIG. 5b schematically illustrates a top view of an articulated tracked vehicle with a front and a rear vehicle unit connected to the load-carrying frame shown in FIG. 4a during a steering maneuver according to an embodiment of the present invention.
Figure 6C:
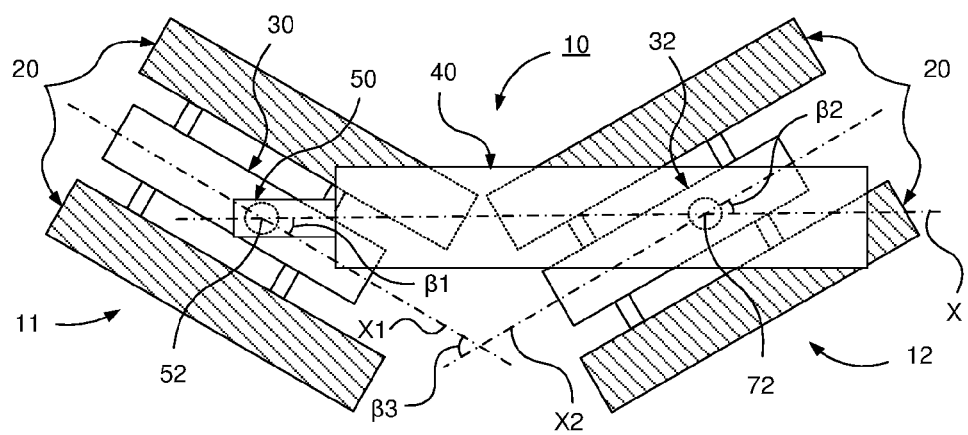
FIG. 6c schematically illustrates a top view of an articulated tracked vehicle with a front and a rear vehicle unit connected with the load-carrying frame shown in FIG. 6a during a steering maneuver according to an embodiment of the present invention.
Figure 6D:
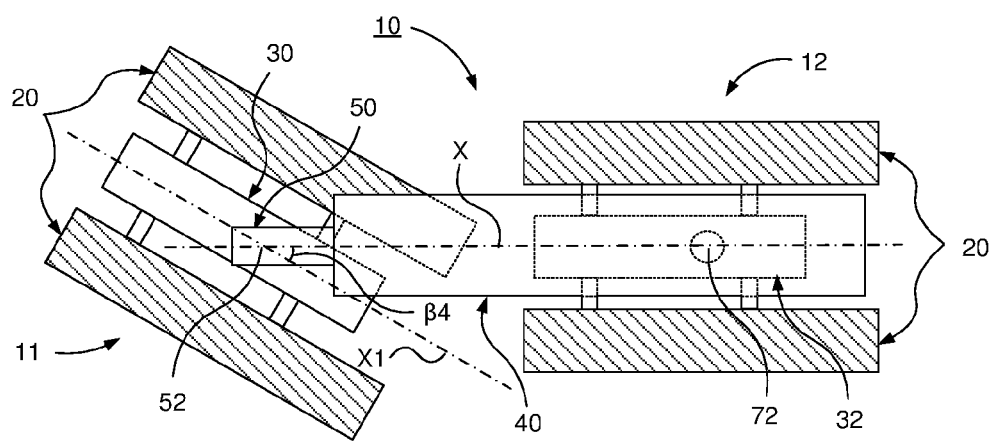
FIG. 6d schematically illustrates a top view of an articulated tracked vehicle with a front and a rear vehicle unit connected with the load-carrying frame shown in FIG. 6a during a steering maneuver according to an embodiment of the present invention.

FIGS. 5b and 6c and 6d show pivoting of said front and rear vehicle units relative to each other and the load-carrying frame 40 during a so called steering maneuver, where the steering maneuver is achieved by rotation of said first and/or second vehicle units 11, 12 relative to the load-carrying frame 40, where said control means is arranged to accomplish said steering maneuver.

According to the example of a steering maneuver shown in FIGS. 5b and 6c, the front and rear vehicle units 11, 12 are pivoted relative to each other and the load-carrying frame 40 about the respective front and rear vertical steering links 52, 72. This causes the front and rear vehicle unit 11, 12 to be pivotally displaced in relation to each other such that the load-carrying frame 40 forms a first angle 31 relative to the longitudinal extension X1 of the first vehicle unit 11, and such that the load-carrying frame 40 forms a second angle β1 relative to the longitudinal extension X2 of the second vehicle unit 12, wherein said first and second angles β1, β2 may be different or equal in degrees. Hereby, during said steering maneuver, the number of degrees of the first or the second angle β1, β2 may be substantially zero. Furthermore, this implies that the front and rear vehicle units 11, 12 are pivotally displaced relative to each other such that they form an angle 33 relative to each other's longitudinal extensions X1, X2.

According to one embodiment, said steering maneuver is achieved by means of said control means by said first and second front steering cylinders of the front steering device 50 and said first and second rear steering cylinders of the rear steering device 70 controlling the rotation about the respective axis Y1, Y2 of the respective front and rear vertical steering links 52, 72, such that said first and second angles β1, β2 are formed. According to one embodiment, the steering cylinders 54a, 54b, 74a, 74b are arranged to be locked in this position to maintain the positions of the vehicle units 11, 12 and the load-carrying frame 40 relative to each other during propulsion of the vehicle 10 during said steering maneuver.

Through such a steering maneuver it is rendered possible for the endless tracks 25 of the rear vehicle unit 12 to run in the same tracks as the endless tracks 25 of the front vehicle unit 11 during the steering maneuver. Consequently, by means of such a steering maneuver, tracking is enabled such that the endless tracks 25 of the rear vehicle unit 12 does not crosscut during ongoing steering maneuver but are made to run in the same tracks as the endless tracks 25 of the front vehicle unit 11. This enables e.g. a forestry vehicle such as a forwarder to be driven at higher speeds since there is no risk that the track assemblies 21 of the rear vehicle unit 12 bumps into an obstacle which has been avoided by the track assemblies 21 of the front vehicle unit 11 during off-road driving.

According to the embodiment of the steering maneuver shown in FIG. 6d, the front vehicle unit 11 is pivoted relative to the load-carrying frame 40 about the front vertical steering link 52, and the rear vehicle unit 12 is aligned with the load-carrying frame 40 such that the load-carrying frame runs in parallel with and is centred relative to the track assembly pair 20 of the rear vehicle unit. This implies that the front vehicle unit 11 is pivotally displaced relative to the rear vehicle unit 12 and the load-carrying frame such that the load-carrying frame 40 forms an angle β4 relative to the longitudinal extension X1 of the first vehicle unit 11 while the rear vehicle unit forms an angle of 0 degrees relative to the load-carrying frame 40. According to an embodiment, said control means is configured to steer said vehicle 10 such that at higher speeds, according to one alternative at speeds exceeding approximately 15 km/h, such that the rear vehicle unit is locked as illustrated in FIG. 6d, independent or dependent of how the front vehicle unit 11 is pivoted relative to the load-varying frame 40 about the front vertical steering link 52.

Thus, by pivoting the vehicle units 11, 12 relative to the load-carrying frame 40 about a front and a rear vertical steering link 52, 72 instead of, as in conventional articulated vehicles, e.g. as shown in FIG. 1, pivoting the vehicle units about a vertical steering link arranged in between the vehicle units, the maneuverability of the vehicle is improved since a larger steering angle can be obtained. Furthermore, the lateral stability of the vehicle 10 is improved by means of said steering maneuver as compared to steering in accordance with the above-mentioned conventional articulated vehicle.

The articulated vehicle comprises an electrical drive arrangement for propulsion of said track assembly pair 20. The electrical drive arrangement comprises a drive unit arranged at the respective track assembly 20 of the respective track assembly pair 20. The respective drive unit is arranged to drive wheels of the respective track assembly 20 for said propulsion of the articulated vehicle. According to one alternative, the respective drive unit is integrated into a respective track assembly 20 for said propulsion. According to one alternative, the respective drive unit comprises an electric motor and a transmission configuration coupled to the electric motor and configured to transfer power from the drive wheels to the respective track assembly 20 for propulsion of the track assembly. According to one alternative, the respective electric motor is arranged such that the axis of the electrical motor runs in the main direction of extension of the track assembly and, consequently, in the main direction of extension of the respective vehicle unit. The respective drive unit is, according to one alternative, integrated into the track support beam of the track assembly.

Said electrical drive arrangement comprises a first drive unit D1 arranged at the right track assembly 21 of the track assembly pair 20 of the front vehicle unit 11. Said electrical drive arrangement comprises a second drive unit D2 arranged at the left track assembly 21 of the track assembly pair 20 of the front vehicle unit 11.

Said electrical drive arrangement comprises a third drive unit D3 arranged at the right track assembly 21 of the track assembly pair 20 of the rear vehicle unit 12. Said electrical drive arrangement comprises a fourth drive unit D4 arranged at the left track assembly 21 of the track assembly pair 20 of the rear vehicle unit 12.

The first drive unit D1 is configured to drive the right track assembly 21 of the front vehicle unit 11 with a speed V1 and a torque M1.

The second drive unit D2 is configured to drive the left track assembly 21 of the front vehicle unit 11 with a speed V2 and a torque M2.

The third drive unit D3 is configured to drive the right track assembly 21 of the rear vehicle unit 12 with a speed V3 and a torque M3.

The fourth drive unit D4 is configured to drive the left track assembly 21 of the rear vehicle unit 12 with a speed V4 and a torque M4.

Thus, the respective track assemblies 21 of the front vehicle unit and the rear vehicle unit are configured such that they can be driven individually. The respective track assemblies 21 of the front vehicle unit and the rear vehicle unit are configured such that they can be individually controlled.

Said control means is hereby, according to one embodiment, arranged to individually control the driving of the respective track assembly 21 of said front and rear track assembly pair 20 to achieve pivoting of said front and rear vehicle units 11, 12 relative to each other.

Said control means is arranged to individually control the driving of the respective track assembly of said front and rear track assembly pairs based on torque and/or speed control. Said control means is arranged to individually control the driving of the respective track assembly of said front and rear track assembly pairs by controlling the torque and/or speed of the respective drive unit D1, D2, D3, D4.

Said control means comprises a control unit 200 for said control of the driving of the respective track assembly 21. Said control unit 200 is signal-connected to the respective drive unit D1, D2, D3, D4 via links for controlling the torque and/or speed of the respective drive unit for said individual control of the track assemblies for steering the articulated vehicle 10 by steering the front vehicle unit 11 relative to the load-carrying frame 40 and the rear vehicle unit 12 about the front vertical steering link and the rear vertical steering link.

Said control unit 200 is also signal-connected to said front steering link 52 and said rear steering link 72. Said control unit 200 is signal-connected to the front steering cylinders (not shown here) connected to the front steering link 52 and to the rear steering cylinders (not shown here) connected to the rear steering link 72.

Figure 7A:
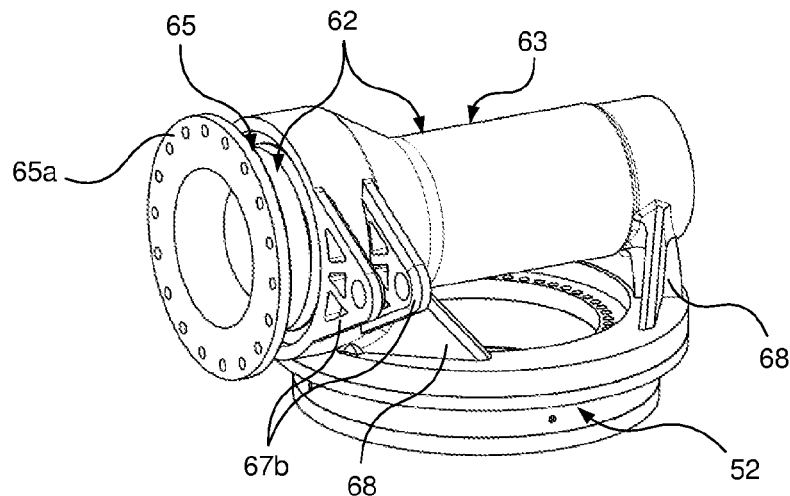
FIG. 7a schematically illustrates a perspective view of a portion of a steering device for the front vehicle unit, arranged to be connected to and interact with the load-carrying frame of the present invention.
Figure 7B:
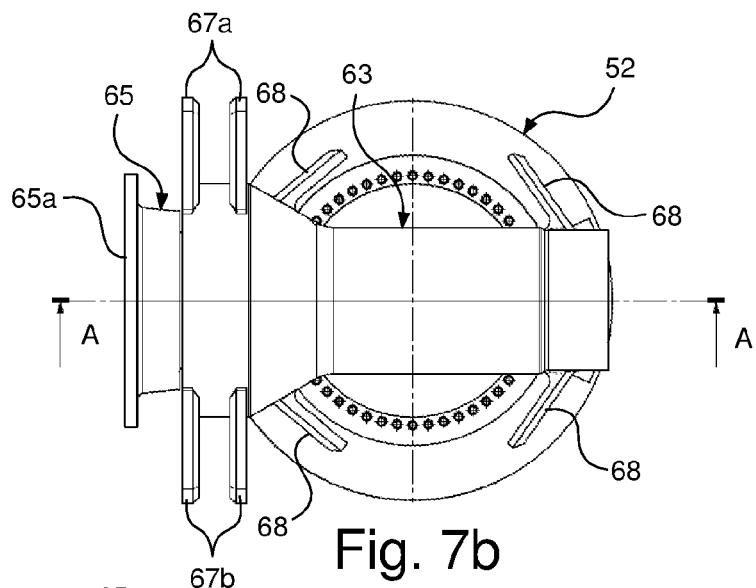
Figure 7C:
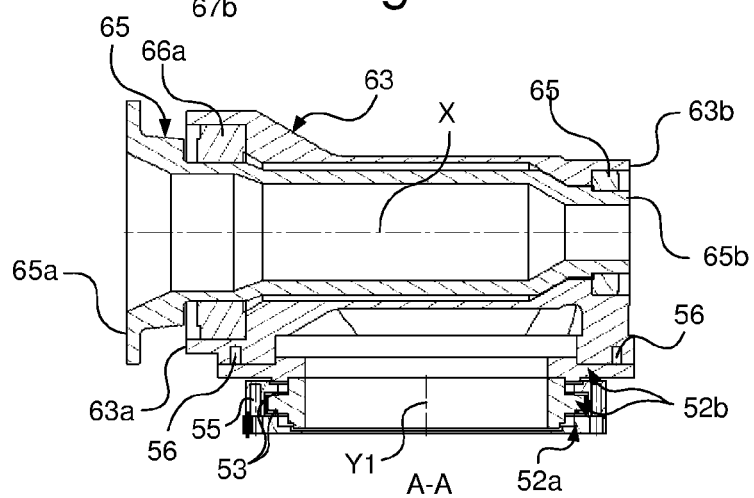
FIG. 7c schematically illustrates a cross section of the steering device shown in FIG. 7b FIG. 8a schematically illustrates a perspective view of a portion of a steering device for the rear vehicle unit, arranged to be connected to and interact with the load-carrying frame of the present invention.

FIG. 7a-c schematically illustrate various views of parts of the front steering device 50 for the front vehicle unit 11, arranged to be connected to and interact with the load-carrying frame 40 according to the present invention.

The front steering device 50 is journaled in said front centre beam 30 The front steering device 50 is pivotally journaled at said front centre beam 30. The front steering device 50 is journaled in said load-carrying frame 40. The front steering device 50 is pivotally journaled at said load-carrying frame 40.

The front steering device 50 comprises a front steering bearing configuration 52 for pivoting of the front vehicle unit 11 relative to the load-carrying frame 40 about said axis Y1 running substantially perpendicular to the longitudinal and lateral extensions of the front vehicle unit 11. The front steering bearing configuration 52 comprises said front vertical steering link 52.

Said front steering bearing configuration 52 is annularly configured. Said front steering bearing configuration 52 comprises an outer bearing ring 52a arranged to be attached to said front centre beam 30. Said outer bearing ring 52a is, according to this embodiment, arranged to be attached to the upper side of said front centre beam 30. Said outer bearing ring 52a is, according to this embodiment, arranged to be attached to said front centre beam 30 such that its centre axis Y1 is oriented substantially centrally relative to the longitudinal extension of the track assembly pair 20 of the front vehicle unit 11. Said outer bearing ring 52a is arranged to be attached to said front centre beam 30 by means of fastening members 55, wherein said fastening members according to one embodiment consist of a screw joint and/or a rivet joint and/or a bolt joint.

Said front steering bearing configuration 52 comprises an inner bearing ring 52b arranged inside said outer bearing ring 52a. Said inner bearing ring 52b is rotatably arranged relative to said outer bearing ring 52a via a sealing-provided bearing 53 for said pivotally journaled attachment. Said inner bearing ring 52b is hence rotatably arranged relative to said front centre beam 30 about an axis Y1 that is perpendicular to the longitudinal and lateral extensions of the front centre beam 30. Said inner bearing ring 52b is rotatably arranged about a vertical axis Y1.

Said front steering device 50 comprises a roll bearing configuration 62 for rotation of the front vehicle unit 11 relative to the load-carrying frame 40 about an axis running substantially in the longitudinal extension of the load-carrying frame 40. The roll bearing configuration 62 comprises said roll link 62.

Said roll bearing configuration 62 is fixedly connected to said steering bearing configuration 52 such that force acting on the roll bearing configuration 62 is transferred to and absorbed by the steering bearing configuration 52. Said roll bearing configuration 62 is adapted to be supported by said steering bearing configuration 52.

Said roll bearing configuration 62 is cylindrically configured. Said roll bearing configuration 62 is arranged to be attached to said load-carrying frame 40 and to said steering bearing configuration 52. Said roll bearing configuration 62 comprises a bearing housing 63. Said bearing housing 63 is arranged to be attached to said inner bearing ring 52b by means of fastening elements 56, wherein said fastening elements according to one embodiment consists of a screw joint and/or rivet joint and/or bolt joint.

Said bearing housing 63 is arranged on top of said steering bearing configuration 52. Said bearing housing 63 comprises a cylindrical body arranged to run across said steering bearing configuration. Said bearing housing 63 is arranged on said steering bearing configuration 52 such that the centre axis X of the cylindrical body of the bearing housing 63 crosses the centre axis Y1 of the steering bearing configuration 52.

Said bearing housing 63 comprises support portions 68 arranged to supportively carry and connect the cylindrical body of the bearing housing 63 to said inner bearing ring 52b.

The bearing housing 63 of the roll bearing configuration 62 is attached to said inner bearing ring 52b of the front steering bearing configuration 52. The bearing housing 63 is thus fixedly connected to the inner bearing ring 52b.

Said roll bearing configuration 62 further comprises an inner roll bearing cylinder 65 arranged inside the cylindrical body of the bearing housing 63. Said roll bearing cylinder 65 is concentrically arranged relative to said cylindrical body of the bearing housing 63. Said roll bearing cylinder 65 is rotatably arranged relative to the cylindrical body of said bearing housing 63. Said inner roll bearing cylinder 65 is rotatably arranged relative to the cylindrical body of said bearing housing 63. Said inner roll bearing cylinder 65 is thus rotatably arranged relative to said front centre beam 30 about an axis X arranged to run in the main longitudinal extension of the load-carrying frame 40.

Said cylindrical body of the bearing housing 63 has a first end 63a intended to face the load-carrying frame 40, and an opposite second end 63b. Said first end 63a has a larger diameter than the opposite second end 63b.

Said inner roll bearing cylinder 65 has a first end 65a intended to face the load-carrying frame 40, and an opposite second end 65b. Said first end 65a has a larger diameter than the opposite second end 65b. Said first end 65a of the inner roll bearing cylinder 65 is arranged to protrude from the cylindrical body of the bearing housing 63. Said first end 65a of said roll bearing cylinder 65 is configured to be attached to the end 40a of the load-carrying frame 40 facing the front steering device 50. The first end 65a of the roll bearing cylinder comprises, according to this embodiment, connection points for a bolt joint or similar.

Said inner roll bearing cylinder 65 is rotatably journaled relative to the cylindrical body of the bearing housing 63 via a first bearing 66a arranged at the first end 63a of the cylindrical body of the bearing housing 63, and a second bearing 66b arranged at the second end of the cylindrical body of the bearing housing 63.

Said inner roll bearing cylinder 65 is arranged to be attached to the load-carrying frame 40. Said inner roll bearing cylinder 65 is arranged to be attached to the end region of the load-carrying frame 40 facing the front steering device 50 of the front vehicle unit 11. Said inner roll bearing cylinder is arranged to be attached to said load-carrying frame 40 by means of fastening elements, wherein said fastening elements according to one embodiment of a screw joint and/or a rivet joint and/or a bolt joint.

The roll bearing configuration further comprises first and second attachment elements 67a, 67b for pivotal attachment of the above mentioned first and second roll steering cylinders 64a, 64b, disposed at the bearing housing 63 on the respective sides of the bearing housing 63.

The front steering bearing configuration 52 comprises first and second attachment elements, not shown in FIG. 7a-c, for pivotal attachment of the above mentioned first and second front steering cylinders 54a, 54b, arranged on respective sides of outer bearing ring 52a.

From the above description and by studying FIG. 4a-4c in conjunction with FIG. 7a-7c it is realized that the roll bearing configuration 62 and the load-carrying frame 40 are arranged relative to each other such that the axis X of said rolling link runs through the load-carrying frame 40. This means that the rolling link X and the load-carrying frame 40 are located in substantially the same horizontal plane.

The roll bearing configuration 62 is arranged directly in front of the load-carrying frame 40 and is preferably positioned centrally in front of the load-carrying frame, where it is attached to the front end of the load-carrying frame. Thereby, the roll bearing configuration 62 is arranged in the extension of the load-carrying frame, in the axial main direction of extension thereof. The roll bearing configuration 62 is further adapted in height relative to the load-carrying frame 40 such that the rolling link axis X runs through the load-carrying frame 40 and preferably through the centre of gravity of the load-carrying frame 40.

Said front centre beam 30 is configured to receive said front steering device 50. Said front centre beam 30 is configured to receive said front steering bearing configuration 52 of the front steering device 50.

Figure 8A:
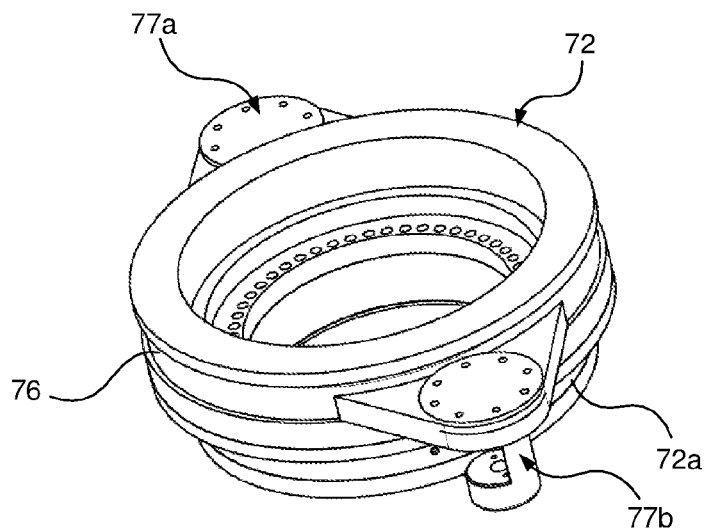
Figure 8B:
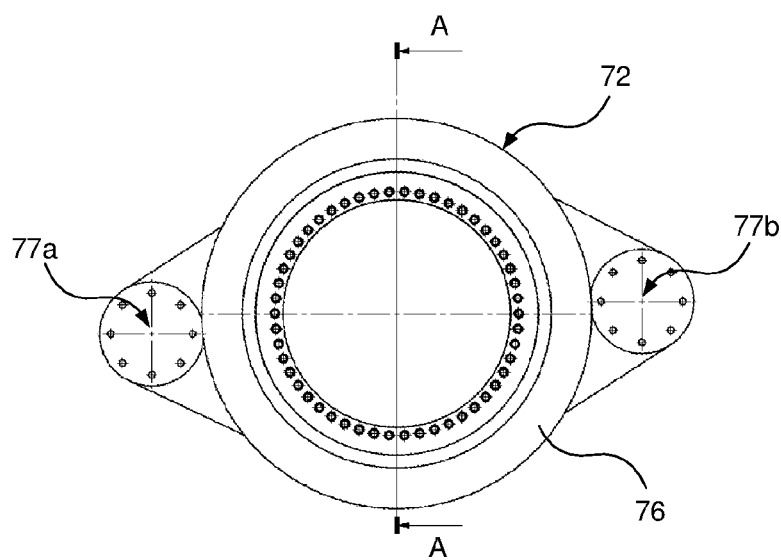
Figure 8C:
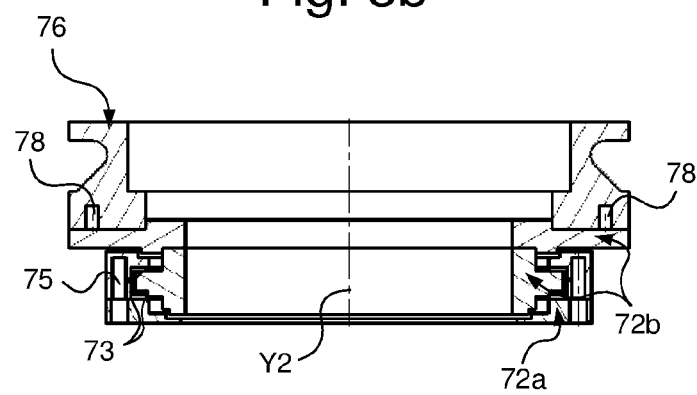
FIG. 8c schematically illustrates a cross section of the steering device shown in FIG. 8b.

FIG. 8a-c schematically illustrate various views of parts of the rear steering device 70 for the rear vehicle unit 12, arranged to be connected to and interact with the load-carrying frame 40 according to the present invention The rear steering device 70 is journaled in said rear centre beam 32. The rear steering device 70 is pivotally journaled at said rear centre beam 32. The rear steering device 70 is journaled in said load-carrying frame 40. The rear steering device 70 is pivotally journaled at said load-carrying frame 40.

The rear steering device 70 comprises a rear steering bearing configuration 72 for pivoting of the rear vehicle unit 12 relative to the load-carrying frame 40 about an axis running substantially perpendicular to the longitudinal and lateral extensions of the rear vehicle unit 12. The rear steering bearing configuration 72 comprises said rear vertical steering link 72.

Said rear steering bearing configuration 72 is annularly configured. Said rear steering bearing configuration 72 comprises an outer bearing ring 72a arranged to be attached to said rear centre beam 32. Said outer bearing ring 72a is, according to this embodiment, arranged to be attached to the upper side of said rear centre beam 32. Said outer bearing ring 72a is, according to this embodiment, arranged to be attached to said rear centre beam 32 such that its centre axis is oriented substantially centrally relative to the longitudinal extension of the track assembly pair 20 of the rear vehicle unit 12. Said outer bearing ring 72a is arranged to be attached to said rear centre beam 32 by means of fastening members 75, wherein said fastening members according to one embodiment consist of a screw joint and/or a rivet joint and/or a bolt joint.

Said rear steering bearing configuration 72 comprises an inner bearing ring 72b arranged inside said outer bearing ring 72a. Said inner bearing ring 72b is rotatably arranged relative to said outer bearing ring 72a via a sealing-provided bearing 73 for said pivotally journaled attachment. Said inner bearing ring 72b is hence rotatably arranged relative to said rear centre beam 30 about an axis Y2 that is perpendicular to the longitudinal and lateral extensions of the rear centre beam 32. Said inner bearing ring 72b is rotatably arranged about a vertical axis Y2.

Said rear vertical steering link 72 is comprised of said inner bearing ring 72b. Said inner bearing ring 72b is thus rotatable about the axis Y2 of the rear vertical steering link.

The rear steering bearing configuration 72 comprises first and second attachment elements 77a, 77b for pivotal attachment of the above mentioned first and second rear steering cylinders 74a, 74b, disposed on respective sides of the outer bearing ring 72a.

Said rear centre beam 32 is configured to receive said rear steering device 70. Said rear centre beam 32 is configured to receive said rear steering bearing configuration of the rear steering device 70.

Said inner bearing ring 72b is, according to this embodiment, arranged to be attached to a bearing element 76 of said rear steering bearing configuration 72 to said inner bearing ring 72b by means of fastening elements 78, wherein said fastening elements according to one embodiment consist of a screw joint and/or a rivet joint and/or a bolt joint.

Said inner bearing ring 72b is, according to this embodiment, arranged to be attached via said bearing member 76 to the underside of said load-carrying frame 40. Said inner bearing ring 72b is, according to this embodiment, arranged to be attached to said load-carrying frame 40 such that its centre axis Y2 is oriented substantially centrally relative to the longitudinal extension of the track assembly pair of the rear vehicle unit 12. Said inner bearing ring 72b is arranged to be attached to said load-carrying frame 40 by means of fastening elements 78, wherein said fastening elements according to one embodiment consist of a screw joint and/or a rivet joint and/or a bolt joint.

FIG. 9 illustrates schematically a system 1 for steering the vehicle 10 according to the present invention.

The system 1 comprises an electronic control unit 200 for said steering.

The system comprises an actuator 310 for steering the vehicle. According to one embodiment, said actuator 310 comprises a steering stick or a steering wheel for said steering.

The system comprises a first position sensor S54a for determining the piston position of the first front steering cylinder 54a. The system comprises a second position sensor S54b for determining the piston position of the second front steering cylinder 54a.

The system comprises a first position sensor S74a for determining the piston position of the first rear steering cylinder 74a. The system comprises a second position sensor S54b for determining the piston position of the second rear steering cylinder 74a.

Said position sensors S54a, S54b, S74a, S74b are, according to one embodiment, incorporated into the respective steering cylinders 54a, 54b, 74a, 74b. Said position sensors S54a, S54b, S74a, S74b are, according to one embodiment, constituted by absolute position sensors.

The system comprises a first drive sensor SD1 for determining the torque and/or speed of the first drive unit D1 of the right track assembly of the front vehicle unit. The system includes a second drive sensor SD2 for determining the torque and/or speed of the second drive unit D2 of the left track assembly of the front vehicle unit.

The system comprises a third drive sensor SD3 for determining the torque and/or speed of the third drive unit D3 of the right track assembly of the rear vehicle unit. The system includes a fourth drive sensor SD4 for determining the torque and/or speed of the fourth drive unit D4 of the left track assembly of the rear vehicle unit.

The system comprises an angle sensing means S52 for determining the rotation angle of the front vertical steering link 52 of the front vehicle unit relative to the load-carrying frame 40.

The system further comprises an angle sensing means S72 for determining the rotation angle of the rear vertical steering link 72 of the rear vehicle unit relative to the load-carrying frame 40.

The system comprises an electronic control unit 200 for steering the vehicle.

The electronic control unit 200 is signal-connected to said actuator 310 via a link. The electronic control unit 200 is arranged to receive, via the link, a signal from said actuator 310 representing steering data in form of a command from the operator/driver of desired steering of the vehicle and its vehicle units.

The electronic control unit 200 is signal-connected to said first position sensor S54a of the first front steering cylinder 54a via a link. The electronic control unit 200 is arranged to receive, via the link, a signal from said first position sensor S54a representing position data on the position of the piston of the first front steering cylinder.

The electronic control unit 200 is signal-connected to said second position sensor S54b of the first front steering cylinder 54a via a link. The electronic control unit 200 is arranged to receive, via the link, a signal from said second position sensor S54b representing position data on the position of the piston of the second front steering cylinder.

The electronic control unit 200 is signal-connected to said first position sensor S74a of the first rear steering cylinder 74a via a link. The electronic control unit 200 is arranged to receive, via the link, a signal from said first position sensor S74a representing position data on the position of the piston of the first rear steering cylinder.

The electronic control unit 200 is signal-connected to said second position sensor S74a of the second rear steering cylinder 74b via a link. The electronic control unit 200 is arranged to receive, via the link, a signal from said second position sensor S74b representing position data on the position of the piston of the second rear steering cylinder.

The electronic control unit 200 is signal-connected to said first drive sensor SD1 via a link. The electronic control unit 200 is arranged to receive, via the link, a signal from said first drive sensor SD1 representing drive data in form of speed data and/or torque data.

The electronic control unit 200 is signal-connected to said second drive sensor SD2 via a link. The electronic control unit 200 is arranged to receive, via the link, a signal from said second drive sensor SD2 representing drive data in form of speed data and/or torque data.

The electronic control unit 200 is signal-connected to said third drive sensor SD3 via a link. The electronic control unit 200 is arranged to receive, via the link, a signal from said third drive sensor SD3 representing drive data in form of speed data and/or torque data.

The electronic control unit 200 is signal-connected to said fourth drive sensor SD4 via a link. The electronic control unit 200 is arranged to receive, via the link, a signal from said fourth drive sensor SD4 representing drive data in form of speed data and/or torque data.

The electronic control unit 200 is signal-connected to said angle sensing means S52 via a link. The electronic control unit 200 is arranged to receive, via the link, a signal from said angle sensing means S52 representing angular data on the rotation angle of the front vertical steering link 52.

The electronic control unit 200 is signal-connected to said angle sensing means S72 via a link. The electronic control unit 200 is arranged to receive, via the link, a signal from said angle sensing means S52 representing angular data on the rotation angle of the rear vertical steering link 72.

The electronic control unit 200 is further signal-connected via respective links to said first and second front steering cylinders 54a, 54b, said roll steering cylinders 64a, 64b, to said first and second rear steering cylinders 74a, 74b, and said first, second, third and fourth drive unit D1 D2, D3, D4.

The electronic control unit is arranged to process the steering data, position data, angular data, and where appropriate also drive data. The electronic control unit 200 is, according to one embodiment, arranged to compare angular data regarding the front steering link 52 from the angle sensing means S52 with angular data regarding the rear steering joint 72 from the angle sensing means S72.

The electronic control unit is arranged to transmit, via links, a signals to said first and second front steering cylinders 54*a*, 54*b* for rotating the front steering link 52 such that the track assembly pair of the front vehicle unit is pivoted relative to the load-carrying frame.

The electronic control unit is arranged to transmit, via links, a signals to said first and second rear steering cylinders 74*a*, 74*b* for rotating the rear steering link 72 such that the track assembly pair of the rear vehicle unit is pivoted relative to the load-carrying frame. According to one embodiment, the rotation of the rear steering link 72 is controlled to assume the same angle as the front steering link 52.

The electronic control unit is arranged to process data from a speed sensor which may be one or more of said drive sensor means SD1, SD2, SD3, SD4, or a non-shown speed sensor that is signal-connected to the electronic drive unit to determine the speed of the vehicle. The electronic control unit is arranged to compare said speed with a predetermined speed. If the current speed of the vehicle exceeds the predetermined speed, the electronic control unit is arranged to lock the rear steering link in a position in which it forms an angle of zero degrees relative to the longitudinal extension of the vehicle, such that longitudinal extension of the rear vehicle unit is aligned with the longitudinal extension of the load-carrying frame, such that the track assembly pair of the rear vehicle unit runs substantially in parallel with the load-carrying frame. This prevents oversteering of the vehicle at high speeds, e.g. when driving the vehicle on the highway. According to one embodiment, said predetermined speed is approximately 15 km/h.

The electronic control unit is arranged to transmit signals via links to the first and second roll steering cylinders 64*a*, 64*b* in order to, based on crane activation data for activation of a crane of the vehicle, such that when the crane is activated, the roll steering cylinders 64*a*, 64*b* are locked in a current position for stiffening the rear vehicle unit that is arranged to carry the crane.

The electronic control unit is arranged to transmit a signals via links to said first, second, third and fourth drive units D1, D2, D3, D4 for controlling individually the track assemblies of the respective track assembly pair such that the track assembly pair of the front vehicle unit is pivoted in relation to the load-carrying frame, where the front vehicle unit is pivoted about the axis of the front steering link 52 relative to the load-carrying frame, and such that the track assembly pair of the rear vehicle unit is pivoted relative to the load-carrying frame, where the rear vehicle unit is pivoted about the axis of the rear steering link 72.

According to one embodiment, the electronic control unit comprises a front electronic control unit 210 arranged in connection to the front vehicle unit and a rear electronic control unit 220 arranged in connection to the rear vehicle unit. The front electronic control unit 210 is signal-connected to the front steering cylinders 54*a*, 54*b*, the roll steering cylinders 64*a*, 64*b*, the first and second drive units D1, D2 and the first and second position sensors S54*a*, S54*b* associated therewith, and the drive sensors SD1, SD2 as well as the angle sensor S52. The rear electronic control unit 220 is signal-connected to the rear steering cylinders 74*a*, 74*b*, the third and fourth drive units D1, D2 and the first and second position sensors S74*a*, S74*b* associated therewith, and the drive sensors SD3, SD4 as well as the angle sensor S72.

The system may comprise any conceivable number of electronic control units arranged at any suitable locations of the vehicle.

Figures 10A, 10B:
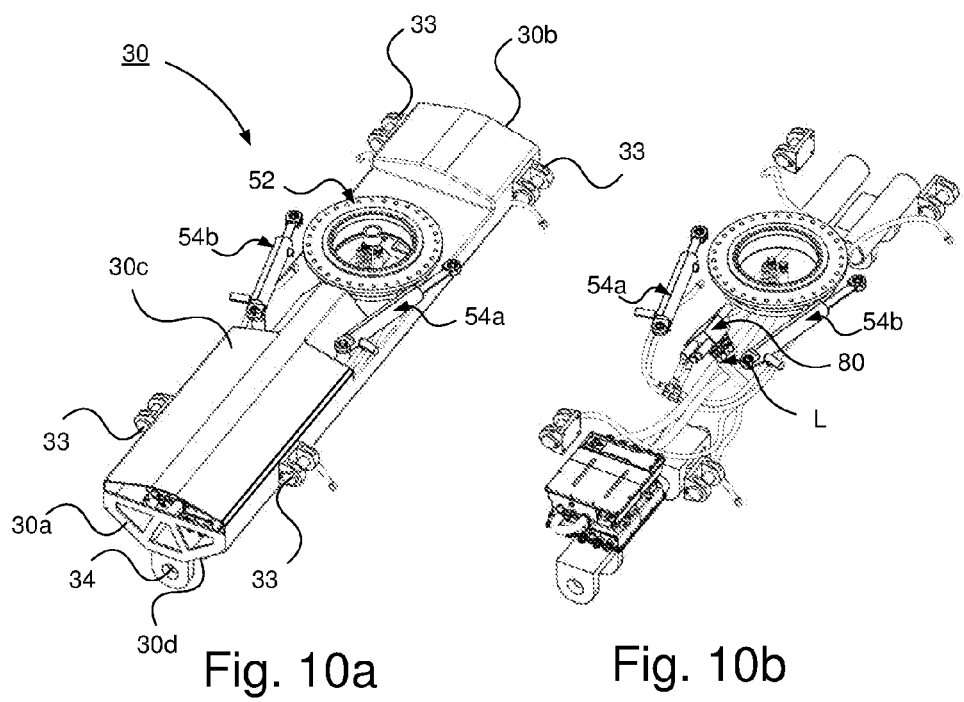
FIG. 10a schematically illustrates a perspective view of a centre beam for connection to the load-carrying frame of the present invention.
FIG. 10b schematically illustrates a perspective view of a centre beam for connection to the load-carrying frame of the present invention.

FIG. 10*a* shows the front centre beam arranged for connection with said track assembly pair 20 and the load-carrying frame 40. Here, the front steering cylinders 54*a*, 54*b* and the front vertical steering link 52 are shown.

Said centre beam 30 is arranged to support vehicle structures. Said centre beam 30 comprises attachment points 33, 34 arranged on the underside and the side of said centre beam 30, wherein said attachment points 33, 34 are configured for attachment of resilient track assembly suspension.

The front centre beam 30 has a front side 30*a* facing forward of the front vehicle unit 11 and a rear side 30*b* facing backwards of the front vehicle unit 11. The front centre beam 30 further has a top side 30*c* for connection to the load-carrying frame 40 and a bottom side 30*d* for connection to the track assembly pair 20 via the trailing arm configuration of the suspension device of the vehicle. The rear centre beam 32 is, in one embodiment, designed substantially similar to the front centre beam 30.

As seen in FIG. 10*b*, said steering cylinders 54*a*, 54*b* are configured to be supplied with a hydraulic medium from a hydraulic line configuration L arranged in said centre beam 30. Said steering cylinders 54*a*, 54*b* are connected to the hydraulic line configuration via a valve block 80 arranged in the centre beam 30. Said steering cylinders 54*a*, 54*b* are in fluid communication with the valve block.

Valves of said valve block 80 are arranged to regulate the hydraulic flow of hydraulic medium to said steering cylinders 54*a*, 54*b*. According to one embodiment, the hydraulic medium comprises oil.

Figure 11:
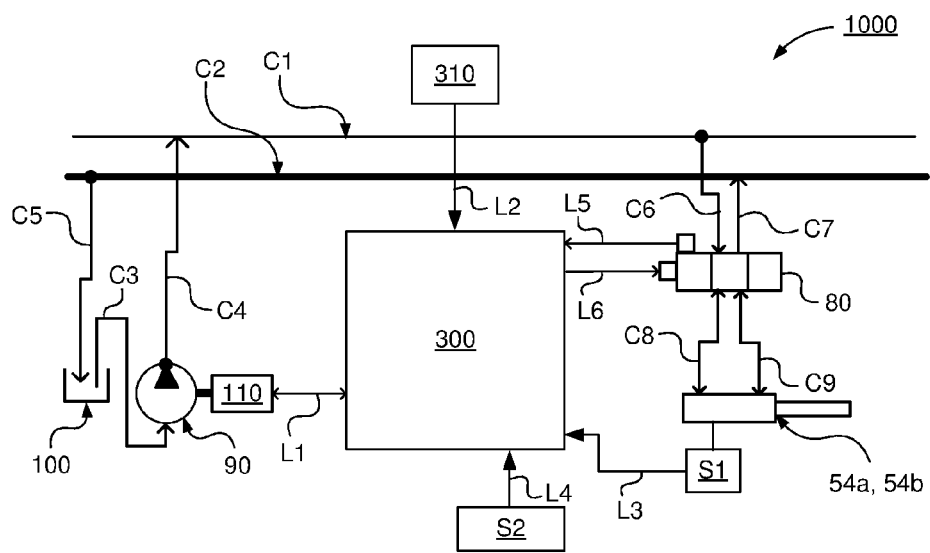
FIG. 11 schematically illustrates a system for controlling steering cylinders for steering of the articulated vehicle of the present invention.

Said hydraulic medium is arranged to be pumped and thereby to be pressurized by means of a pump device 90 for said supply, shown in FIG. 11. Said hydraulic medium is arranged to be pumped from a reservoir 100 shown in FIG. 11. Hereby, said steering cylinders 54*a*, 54*b* are connected to said hydraulic line configuration L via said valve block 80.

Said hydraulic line configuration L comprises hydraulic lines for regulation of hydraulic medium in said steering cylinders 54*a*, 54*b*, connected to the respective steering cylinders 54*a*, 54*b* via said valve block 80.

Correspondingly, said roll steering cylinders 64*a*, 64*b* are configured to be supplied with said hydraulic medium from the hydraulic line configuration L arranged in said centre beam 30 and connected via a valve block 80 arranged in the centre beam 30.

Correspondingly, said steering cylinders 74*a*, 74*b* are configured to be supplied with said hydraulic medium from the hydraulic line configuration arranged in the rear centre beam 32 and connected via a valve block arranged in the rear centre beam 30.

FIG. 11 schematically illustrates a system 1000 for controlling steering cylinders for steering a vehicle unit, herein the front vehicle unit 11, according to one embodiment of the present invention.

The system 1000 comprises a hydraulic line configuration for the supply of hydraulic medium to steering cylinders 54*a*, 54*b*.

The hydraulic line configuration comprises a pressure line C1 to which pressurized hydraulic medium is arranged to be supplied for the supply to said steering cylinders 54*a*, 54*b*.

The hydraulic line configuration further comprises a return line C2 configured to receive hydraulic medium from said steering cylinders 54a, 54b.

The system further comprises a hydraulic reservoir 100 arranged to hold hydraulic medium for said hydraulic line configuration. Said hydraulic reservoir 100 is arranged to receive hydraulic medium from said return line C2.

The system further comprises a pump unit 90 for pumping hydraulic medium from said hydraulic reservoir 100 to said pressure line C1. Said pump unit 90 is arranged to pressurize said hydraulic medium.

The system further comprises a pump drive unit 110 for operating said pump unit 90 for pumping said hydraulic medium. Said pump drive unit 110 is, according to one embodiment, constituted by an electric machine.

Said pump unit 90 is arranged to pump hydraulic fluid from the reservoir 100 via a line C3. Said pump unit 90 is arranged to pump hydraulic medium to the pressure line C1 via a line C4.

Said hydraulic line configuration comprises a reservoir return line C5 in fluid connection with the return line C2, arranged to return the hydraulic medium to said hydraulic reservoir 100.

Said hydraulic line configuration comprises a supply line arrangement C6 in fluid connection with the pressure line C1, for the supply of pressurized hydraulic medium to said steering cylinders 54a, 54b.

Said hydraulic line configuration comprises a reverse line arrangement C7 in fluid connection with the return line C2, for returning the pressurized hydraulic medium from said steering cylinders 54a, 54b to the return line C2.

Said system comprises a valve block 80. Said valve block 80 is in hydraulic connection with said supply line arrangement C6. Said valve block 80 is further in hydraulic fluid connection with said reverse line arrangement C7 for returning the fluid medium via said valve block 80.

Said steering cylinders 54a, 54b comprise a right and left steering cylinder 54a, 54b. Said right and left steering cylinders 54a, 54b are connected in parallel with each other.

Said hydraulic line configuration comprises a first line arrangement C8 in fluid connection with said steering cylinders 54a, 54b, for fluid communication between said steering cylinders 54a, 54b and a second line arrangement C9 in fluid connection with said steering cylinders 54a, 54b, wherein said first and second line arrangements C8, C9 are configured for fluid communication between said steering cylinders 54a, 54b and the valve block 80 for regulation of pressure in said steering cylinders 54a, 54b.

The system comprises a so called load-sensing system (eng. Load Sensing System).

The system comprises an actuator 310 for steering the vehicle. According to one embodiment, said actuator 310 comprises a stick or a wheel for said steering.

The system comprises position sensing means S1 for determining the piston position of the respective steering cylinder 54a, 54b.

The system further comprises angle sensing means S2 for determining the angle of the vertical steering link (not shown here) of the front vehicle unit, connected to the steering cylinders 54a, 54b.

The system comprises an electronic control unit 300 for controlling the load-sensing system, including controlling the pump drive unit 110 and the valve block 80.

Said electronic control unit 300 is signal-connected to the pump drive unit 110 via a link L1. Said electronic control unit is arranged to receive, via the link L1, a signal from the pump drive unit 110 representing pump operation data for regulation of the pressure in the pressure line C1.

Said electronic control unit 300 is arranged to transmit, via the link L1, a signal to the pump drive unit 110 representing pump operation data for operation of the pump.

The electronic control unit 300 is signal-connected to the actuator 310 via a link L2. The electronic control unit 300 is arranged to receive, via the link L2, a signal representing steering data for steering the steering cylinders 54a, 54b.

The electronic control unit 300 is signal-connected to said position sensing means S1 via a link L3. The electronic control unit 300 is arranged to receive, via the link L3, a signal representing position data for the position of the piston of the respective steering cylinder 54a, 54b.

The electronic control unit 300 is signal-connected to said angle sensing means S2 via a link L4. The electronic control unit 300 is arranged to receive, via the link L4, a signal representing angular data for the angular position of the steering link of the front vehicle unit. The electronic control unit 300 is, according to one embodiment, arranged to compare said angular data with corresponding angular data detected by means of angle sensing means in connection with the steering link of the rear vehicle unit, as a basis for the control of hydraulic flow in order to obtain the same angle for both steering links so as to enable tracking such that the track assemblies of the rear vehicle unit run in the same tracks as the track assemblies of the front vehicle unit, in order to reduce ground damages and facilitate avoidance of collision of the rear vehicle unit with obstacles that the driver has already avoided with the front vehicle unit.

The electronic control unit 300 is signal-connected to the valve block via a link L5. The electronic control unit is arranged to receive, via the link L5, a signal from the valve block representing load data on the current load.

The electronic control unit 300 is signal-connected to the valve block 80 via a link L6. The electronic control unit is arranged to transmit, via the link L6, a signal to the valve block 80 representing control data for controlling the opening/closing of the valves of the valve block 80 based on said steering data, said position data, said angular data and said load data for controlling.

Above there has been described an articulated tracked vehicle having a front and a rear vehicle unit with a load-carrying frame connecting the vehicle units, where the load-carrying frame is pivotally connected to a front vertical steering link arranged centrally of the front vehicle unit and pivotally connected to a rear vertical steering link arranged centrally of the rear vehicle unit such that the front and rear vehicle units are pivotable relative to each other and the load-carrying frame. According to an alternative embodiment, the load-carrying frame is only pivotally connected to the front vertical steering link and fixedly connected to the rear vehicle unit, preferably such that the load-carrying frame runs in the longitudinal extension of the rear vehicle unit.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. An articulated tracked vehicle comprising:
   a front vehicle unit and a rear vehicle unit;
   a rigid load-carrying frame connecting the front and rear vehicle units, wherein said load-carrying frame is pivotally attached to the front vehicle unit about a front vertical steering link and pivotally attached to the rear vehicle unit about a rear vertical steering link, and the load-carrying frame is disposed on top of the front and rear vehicle units so as to directly accommodate an external load; and
   a steering device arranged to steer the front vehicle unit relative to the load-carrying frame about the front vertical steering link and to steer the rear vehicle unit relative to the load-carrying frame about the rear vertical steering link, and said steering device being arranged such that the front and rear vehicle units are individually steerable relative to the load-carrying frame about their respective vertical steering links.

2. The articulated tracked vehicle of claim 1, wherein the steering device comprises a front steering device arranged to steer the front vehicle unit relative to the load-carrying frame about the front vertical steering link, and a rear steering device arranged to steer the rear vehicle unit relative to the load-carrying frame about the rear vertical steering link, wherein the front and rear steering devices are individually controlled by means of a control unit.

3. The articulated tracked vehicle of claim 1, wherein the front vertical steering link is arranged substantially centrally of the front vehicle unit and the rear vertical steering link is arranged substantially centrally of the rear vehicle unit.

4. The articulated tracked vehicle of claim 1, wherein said front vehicle unit comprises a rolling link extending in the axial main direction of extension of the load-carrying frame, wherein the load-carrying frame is configured for rotatable attachment to said rolling link such that said front vehicle unit is allowed to rotate relative to the load-carrying frame about the axis of said rolling link such that said front and rear vehicle units are allowed to rotate relative to each other about said rolling link.

5. The articulated tracked vehicle of claim 4, wherein said rolling link extends in the extension of the load-carrying frame such that the axis of the rolling link runs through the load-carrying frame.

6. The articulated tracked vehicle of claim 4, wherein said steering device further is arranged to steer the front and rear vehicle units relative to each other by steering the front vehicle unit relative to the load-carrying frame about the axis of said rolling link.

7. The articulated tracked vehicle of claim 1, wherein the front vehicle unit comprises a front track assembly pair, wherein the front vertical steering link is arranged between the respective track assemblies of the front track assembly pair and substantially centrally arranged relative to the longitudinal extension of the front track assembly pair such that the weight of the load carried by the load-carrying frame is distributed to be carried centrally over said track assembly pair of said front vehicle unit, and wherein the rear vehicle unit comprises a rear track assembly pair, wherein the rear vertical steering link is arranged between the respective track assemblies of the rear track assembly pair and substantially centrally arranged relative to the longitudinal extension of the rear track assembly pair such that the weight of the load carried by the load-carrying frame is distributed to be carried centrally over said track assembly pair of said rear vehicle unit.

8. The articulated tracked vehicle of claim 1, wherein said steering device comprises a first and a second front steering member arranged to pivot said front vehicle unit about said front vertical steering link.

9. The articulated tracked vehicle of claim 1, wherein said steering device comprises a first and a second rear steering member arranged to pivot said rear vehicle unit about said rear vertical steering link.

10. The articulated tracked vehicle of claim 4, wherein said steering device comprises a first and a second roll steering member arranged to rotate the front vehicle unit relative to the load-carrying frame about the axis of said rolling link such that said front and rear vehicle units are allowed to rotate relative to each other about said rolling link.

11. The articulated tracked vehicle of claim 8, wherein said first and second steering members and/or said first and second roll steering members are constituted by steering cylinders.

12. The articulated tracked vehicle of claim 1, wherein said steering device further comprises a control unit arranged to individually regulate the control of at least one of a front steering member for steering about the front vertical steering link, a rear steering member for steering about the rear vertical steering link, and a roll steering member to effectuate pivoting of said front and rear vehicle units relative to each other.

13. The articulated tracked vehicle of claim 12, wherein said control unit is arranged to individually regulate the control of each of said front steering element, rear steering element and roll steering element.

14. The articulated tracked vehicle of claim 7, wherein said steering device further comprises a control unit arranged to individually control the operation of the respective track assembly of said front and rear track assembly pair to effectuate pivoting of said front and rear vehicle units relative to each other.

15. The articulated tracked vehicle of claim 14, wherein said control unit is arranged to individually control the operation of the respective track assembly of said front and rear track assembly pairs based on torque and/or speed control.

16. The articulated tracked vehicle of claim 1, wherein said steering device is arranged to control the pivoting of said front and rear vehicle units about said front and rear vertical steering links to achieve crab steering.

17. The articulated tracked vehicle of claim 7, wherein the front vertical steering link is pivotally attached to a front centre beam of the front vehicle unit, wherein the centre beam is disposed in between the respective track assemblies of said front track assembly pair and interconnecting said front track assembly pair of said front vehicle unit, and wherein the rear vertical steering link is pivotally attached to a rear centre beam of the rear vehicle unit, wherein the centre beam is disposed in between the respective track assemblies of said rear track assembly pair and interconnecting said rear track assembly pair of said rear vehicle unit.

18. The articulated tracked vehicle of claim 1, wherein said articulated tracked vehicle is a forestry machine.

19. The articulated tracked vehicle of claim 1, wherein said articulated vehicle tracked is a forwarder.

20. The articulated tracked vehicle of claim 1, wherein said articulated vehicle is a diesel-electric vehicle.

* * * * *